US012665697B2

(12) United States Patent
Cline

(10) Patent No.: US 12,665,697 B2
(45) Date of Patent: Jun. 23, 2026

(54) COMMUNICATION SYSTEMS AND METHODS

(71) Applicant: Lattice Semiconductor Corporation, Hillsboro, OR (US)

(72) Inventor: Ronald L. Cline, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 202 days.

(21) Appl. No.: 18/412,436

(22) Filed: Jan. 12, 2024

(65) Prior Publication Data

US 2024/0154718 A1 May 9, 2024

Related U.S. Application Data

(63) Continuation of application No. PCT/US2021/042092, filed on Jul. 16, 2021.

(51) Int. Cl.
H04L 1/00 (2006.01)
(52) U.S. Cl.
CPC .................................. H04L 1/0029 (2013.01)
(58) Field of Classification Search
CPC .......... H04L 1/0029; H04L 9/001; H04L 9/12
See application file for complete search history.

(56) References Cited

U.S. PATENT DOCUMENTS

| | | | |
|---|---|---|---|
| 7,986,251 B2 | 7/2011 | Bae et al. | |
| 8,742,957 B2 | 6/2014 | Ang et al. | |
| 9,172,426 B2 | 10/2015 | Lee et al. | |
| 9,337,997 B2 | 5/2016 | Sengoku et al. | |
| 9,455,850 B2 | 9/2016 | Wiley | |
| 2008/0191776 A1* | 8/2008 | Song ........................ | H03K 5/08 |
| | | | 327/331 |
| 2016/0179739 A1* | 6/2016 | Kil .......................... | G05F 1/625 |
| | | | 710/106 |
| 2016/0239647 A1 | 8/2016 | Johnson et al. | |

* cited by examiner

*Primary Examiner* — Sung S Ahn
(74) *Attorney, Agent, or Firm* — Haynes and Boone, LLP

(57) ABSTRACT

Various techniques are provided to implement information leakage mitigation associated with data communications. In one example, a method includes receiving a bitstream including a plurality of bits. The method further includes, for each bit of the plurality of bits, transitioning between two states of a plurality of states in response to the bit; inverting a differential pair of data signals associated with the bit in response to the transitioning to obtain differentially transitioned data signals; maintaining a third data signal associated with the bit in response to the transitioning; and transmitting each data signal of the differentially transitioned data signals and the third data signal over a respective wire. Related systems and devices are provided.

20 Claims, 11 Drawing Sheets

500

505 — Receive bit of bitstream

510 — Generate current set of data signals based on bit and previous set of data signals 515 — Transmit current set of data signals 520 — Store indication of current set 525 — Set current set as previous set 530 — Repeat for remaining bits of bitstream

550

555 — Receive current set of data signals associated with bitstream

560 — Determine current bit based on current set of data signals and previous set of data signals 565 — Store indication of current set of data signals 570 — Set current set as previous set 575 — Repeat for remaining sets of data signals associated with bitstream

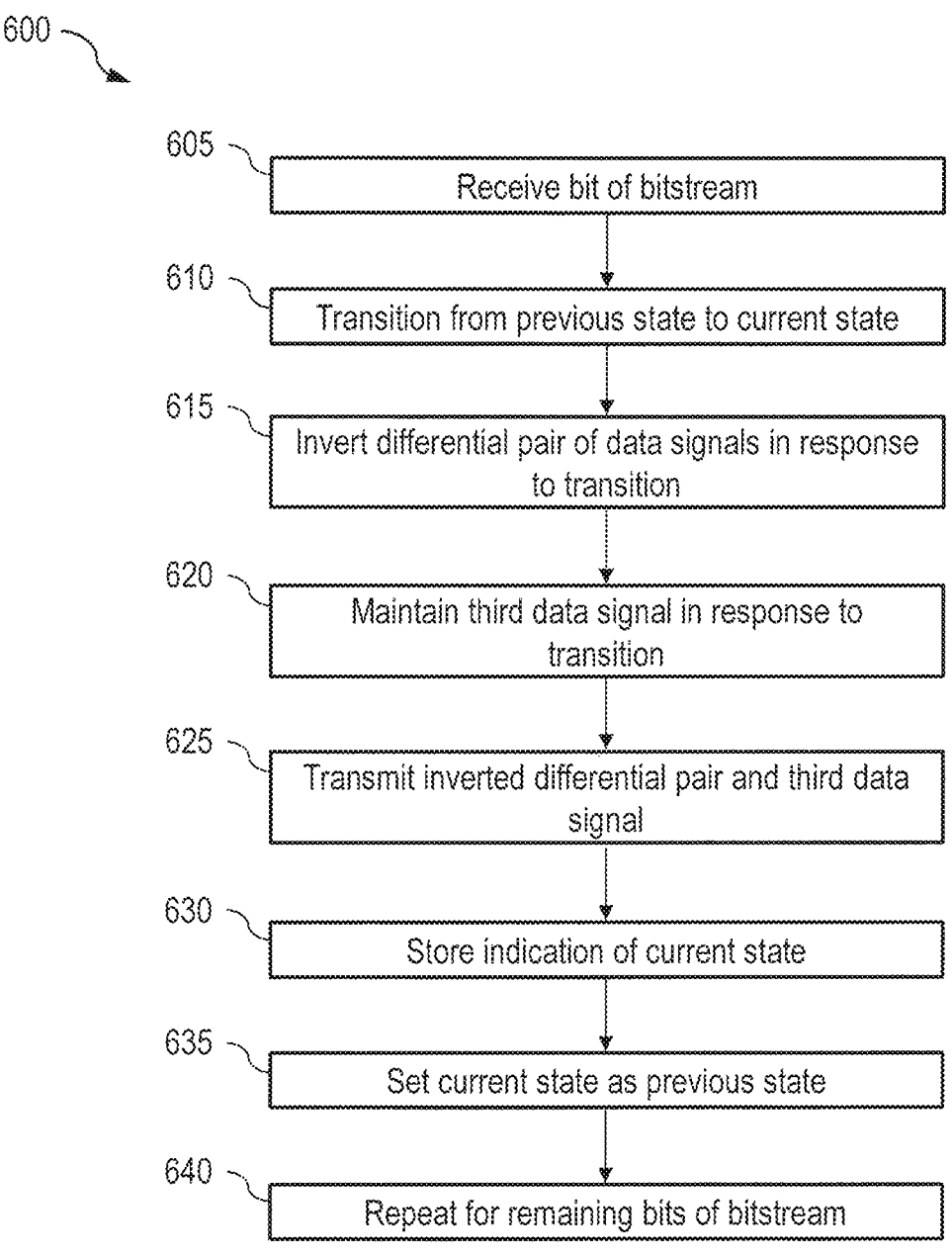

600

605 — Receive bit of bitstream

610 — Transition from previous state to current state

615 — Invert differential pair of data signals in response to transition

620 — Maintain third data signal in response to transition

625 — Transmit inverted differential pair and third data signal

630 — Store indication of current state

635 — Set current state as previous state

640 — Repeat for remaining bits of bitstream

655 — Receive set of data signals associated with bitstream

660 — Transition from previous state to current state

665 — Determine bit in response to transition

670 — Store indication of current state

675 — Set current state as previous state

680 — Repeat for remaining sets of data signals associated with bitstream

900

905  Receive design

910  Synthesize design into components

915  Map components to PLD

920  Perform placement of components

925  Route connections

930  Generate configuration data

940  Program PLD

COMMUNICATION SYSTEMS AND METHODS

CROSS-REFERENCE TO RELATED APPLICATIONS

This patent application is a continuation of International Application No. PCT/US2021/042092, filed Jul. 16, 2021 and entitled "Communication Systems and Methods", which is claimed for the benefit of and incorporated herein by reference in its entirety.

TECHNICAL FIELD

The present invention relates generally to communication systems and data security and, more particularly, to signaling systems and methods for example for facilitating information leakage mitigation.

BACKGROUND

Providing secure transfers of data has become increasingly important. In some cases, within any network environment, such secure transfer of data may occur between components of a chip, between components of different chips, over intranetworks, and/or over internetworks, such as the Internet.

BRIEF DESCRIPTION OF THE DRAWINGS

FIG. 6A illustrates a flow diagram of an example encoding process for facilitating information leakage mitigation in accordance with one or more embodiments of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
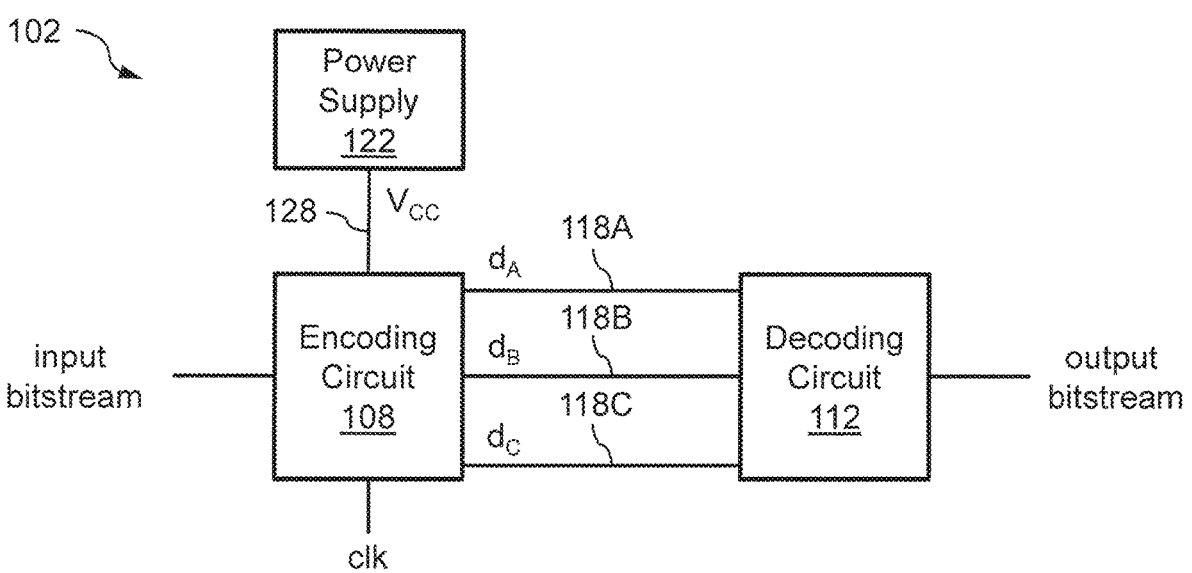
FIG. 1 illustrates an example network environment in which data is communicated in accordance with one or more embodiments of the disclosure.

Various techniques are provided to facilitate mitigation/suppression of information leakage associated with wired transmissions. In various embodiments, mitigation/suppression may be implemented to address side-channel attacks. Side-channel attacks may refer to attacks by an adversary (e.g., also referred to as an adversarial device, an attacker, or a hacker) that do not directly involve an attempt at accessing data communicated by an attacked device, but instead rely on collecting information that may be leaked by the attacked device through general usage/operation of the attacked device and determining data communicated by the attacked device based on such leaked information. In this regard, in some cases, such leaks may be determined based on monitoring a power profile of the device when the device is communicating data. Mitigation techniques provided herein may be applied on top of/in addition to other mitigations and/or countermeasures that may be performed.

As such, data transmissions (e.g., secure data transmissions) over wires may exhibit undesired data leakage that may need to be mitigated/suppressed. In some attacks, the adversary may be able to collect information leaked by a device associated with data transmitted by the device. As an example, an undesired data leakage resulting from the data transmitted by the device may occur via leakage through supply lines (e.g., common power supply lines). The undesired data leakage may be in the form of a dynamic signal (e.g., dynamic current) that the adversary may sense (e.g., side-channel sense) to extract information associated with the data transmitted by the device. In this regard, data wires and associated loads present capacitances and inductances that are charged and discharged. Thus, a presence or an absence of data propagating through the wires, and in some cases even actual values of the data, may potentially be extracted through side-channel sensing. The undesired data leakage, if not mitigated, may allow the adversary to determine the data (or portion thereof) transmitted by the device.

In some embodiments, multi-wire, single bit transmissions are performed by a transmission system to mitigate leakage information associated with data transmissions. Data is encoded in a transition of signals in a multi-wire transmission system. In this regard, for any given input data bit, multiple data bits (e.g., also referred to as transmission bits, encoded data bits, or variant thereof) may be generated and the data bits converted (e.g., driven) to data signals having appropriate signal levels (e.g., current levels or voltage levels). Each data signal may be provided onto one of the wires. In an aspect, a power signal (e.g., a current signal) from a power supply is used to appropriately charge or discharge one or more of the wires to provide the data signals on the wires. The multiple data bits collectively or, equivalently, the data signals collectively may provide a state (e.g., also referred to as an active state) of the transmission system.

To facilitate mitigation/suppression of leakage information, encoding schemes may be defined in which a state transition of the transmission system may occur in response to each received input data bit. In this regard, a state transition may occur even when a value of an input data bit (e.g., 1 or 0) does not change from its previous value. The encoding schemes may be further defined such that every state of the transmission system may have a predetermined number of transmission bit(s) at a first logic level and a predetermined number of transmission bit(s) at a second logic level. For example, in a three-wire case, all states of the transmission system may have two transmission bits being a zero (e.g., logic low) and one transmission bit being a one (e.g., logic high).

In some aspects, by having encoding schemes with state transitions occurring with each received input bit and logic composition (e.g., number of zeroes and ones) remaining constant across states, activity/effect associated with the power supply that provides power to the wires remains nominally/substantially the same for any state transition allowed by the encoding schemes. In this regard, for any given state transition, any activity/effect (e.g., power supply signal spikes) associated with charging or discharging the wires are nominally the same regardless of whether the value of the input bit is a 1 or a 0. As such, information extractable from the supply line(s) used to transfer power from the power supply to the wires are not usable to determine data signals being communicated over the wires. In a case where a state transition occurs each clock cycle, every clock cycle is associated with the same result (e.g., same power spike) from a point of view of a system power supply line(s) regardless of whether the input bit is a 1 or a 0 and thus information extractable from the supply line(s) by an adversary are not usable to determine data signals being communicated over the wires. In some cases, a twisted wire approach may be implemented such that the only radiated signal from the wires is the fundamental clock frequency.

In some cases, signal levels provided on the wires may be full complementary metal-oxide-semiconductor (CMOS) levels. CMOS signal swings from a logic low level to a logic high level, or vice versa, may be around 5 V (e.g., around 0 V for logic low and around 5 V for logic high) or less (e.g., as low as 1 V or even lower depending on technology level). In some cases, signal levels associated with different semiconductor technologies/schemes (e.g., material systems, processes) may be used as appropriate dependent on application and/or available resources. In other cases, other electrical single-ended signaling methods may be used to generate the differential signals utilized in one or more embodiments.

Thus, using various embodiments, chip real estate for routing resources may be designated/implemented as appropriate for facilitating multi-wire, single bit transmissions while providing data leakage mitigation/suppression. In some cases, such wires may be used for inter-chip connections, inter-device connections, intra-chip connections, intra-device connections, and/or generally any wired communications so long as signals having appropriate signal levels are utilized such that the signals can traverse over desired distances/lengths of wire. In some cases, data signaling may be applied to on-chip signaling as well as point-to-point board-level signaling.

As one example, the transmission system may implement three-wire, single data bit transmissions. For encoding schemes in accordance with one or more embodiments, each state of the transmission system may have two bits of a first logic level and a remaining bit of a second logic level complementary to (e.g., inverse of) the first logic level. As an example, the transmission system may have states with only one of the three transmission bits being a one (e.g., logic high) at any given time, in which the states of the transmission system include 001, 010, and 100. As another example, the transmission system may have states with only one of the three transmission bits being a zero (e.g., logic low) at any given time, in which the states of the transmission system include 110, 101, and 011. There are thus two transition possibilities from any given state. A data input bit of 0 may be assigned (e.g., arbitrarily assigned) one of the two transitions, while a data input bit of 1 may be assigned to the remaining of the two transitions.

A state transition may involve two of the three transmission bits changing values while the remaining transmission bit maintains its value (e.g., remains static). In some cases, the two transmission bits that change value form a differential pair (e.g., one transmission bit is associated with a logic low and the other transmission bit is associated with a logic high) and a transition of these two data values may be referred to as a differential transition. Appropriate circuitry, such as driver circuitry, may be used to convert the transmission bits to appropriate signal levels (e.g., voltage levels) provided on the wires. In this regard, for any given input data bit, a two-wire differential transition is encoded with a third wire remaining static. In some cases, the differential transition is a full CMOS differential transition. In a case where a data bit is processed in each clock cycle, a state transition occurs each clock cycle (e.g., even if the input data bit does not change from its previous value) and, as such, at every clock pulse there is a two-wire differential signal. Every clock cycle is associated with the same result (e.g., same power spike associated with a two-wire differential transition, while a third wire remains static) from a point of view of a system power supply line(s) and thus information extractable from the supply line(s) by an adversary are not usable to determine data signals being communicated over the wires. In some cases, a twisted wire approach may be implemented such that the only radiated signal from the wires is the fundamental clock frequency.

Referring now to the drawings, FIG. 1 illustrates an example network environment 102 in which data is communicated in accordance with one or more embodiments of the disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The network environment 102 includes an encoding circuit 108 (e.g., also referred to as an encoding device or an encoder), a decoding circuit 112 (e.g., also referred to as a decoding device or a decoder), wires 118A-C, a power supply 122, and a power line 128. The wires 118-C connect the encoding circuit 108 and the decoding circuit 112. The encoding circuit 108 and the decoding circuit 112 may be implemented on a single chip or multiple chips (e.g., within one device or over multiple devices). For example, when the encoding circuit 108 and the decoding circuit 112 are implemented on the same chip, the wires 118A-C may provide intra-chip and/or intra-device connections (e.g., to facilitate block to block communication across a chip). When the encoding circuit 108 and the decoding circuit 112 are implemented on separate chips, the wires 118A-C may provide inter-chip and/or inter-device connections.

The encoding circuit 108 may receive a bit of an input bitstream, encode the bit to obtain transmission bits A, B, and C, and convert (e.g., drive) the transmission bits A, B, and C to data signals $d_A$, $d_B$, and $d_C$ having appropriate signal levels (e.g., voltage levels or current levels) for transmission over the wires 118A, 118B, and 118C, respectively. In some cases, the signal levels may be CMOS levels. In this regard, the wires 118A-C may collectively provide a 1-bit data bus for transmitting data associated with the bit of the input bitstream. In some cases, a twisted wire approach may be implemented such that the only radiated signal from the three wires 118A-C is the fundamental clock frequency. Since the transmission bits A, B, and C have direct correspondences/relations to the data signals $d_A$, $d_B$, and $d_C$, the transmission bits and the data signals may be referred to interchangeably herein for discussion purposes. As one non-limiting example, the input bitstream may include data associated with a key exchange for facilitating secure communication between a system that includes the encoding circuit 108 and a system that includes the decoding circuit 112. Other types of secure data content provided in the input bitstream may include software revisions and secure personal data. The encoding circuit 108 may operate according to a clock signal clk. In some cases, the encoding circuit 108 may encode one bit of the input bitstream during each clock cycle. An example of an encoding scheme performed by the encoding circuit 108 is described below with respect to FIG. 2.

The decoding circuit 112 may receive the data signals $d_A$, $d_B$, and $d_C$ on the wires 118A-C and decode the data signals to obtain an output bitstream (e.g., also referred to as an output data stream). In general, when decoding is performed correctly, each bit of the output bitstream is the same as, or is indicative of, a corresponding bit of the input bitstream. For example, for a given bit of the input bitstream, the encoding circuit 108 may generate data signals and provide these data signals on the wires 118A-C. The decoding circuit 112 may decode/convert the data signals on the wires 118A-C to obtain a value (e.g., 0 or 1) of the bit of the input bitstream used by the encoding circuit 108 to generate the data signals. The decoding circuit 112 may provide the output bitstream to one or more components downstream of the decoding circuit 112 that may utilize the output bitstream. Although not shown in FIG. 1, the decoding circuit 112 may also operate according to a clock signal. In some aspects, to facilitate encoding and decoding, the clock signal for the decoding circuit 112 may be synchronized with and/or have the same clock frequency as the clock signal clk associated with the encoding circuit 108.

The power supply 122 may supply power (e.g., voltages and/or currents) to the encoding circuit 108. The power may be provided to the encoding circuit 108 via the power line 128. In FIG. 1, the power supply 122 supplies a voltage Vcc to the encoding circuit 108. In some cases, in addition to supplying power to the encoding circuit 108, the power supply 122 may supply power to one or more other components. In some cases, the power line 128 may be part of a power bus (e.g., a common supply line(s)) onto which power supply 122 provides power. The power bus may provide the power to the encoding circuit 108 and other components not shown in FIG. 1. The power from the power supply 122 may be supplied over one or more power buses. In some cases, the power supply 122 may be implemented as a battery or battery bank, for example, with integrated charging and monitoring electronics. In some cases, the power supply 122 may receive grid or other external power and include various power conditioning, regulating, and/or conversion components to supply power over one or more power buses. Power buses may include one or more conductive wires and/or traces to convey supplied power (e.g., voltages and/or currents) to various components.

In some embodiments, the encoding circuit 108 facilitates multi-wire, single bit transmissions to mitigate leakage information associated with data transmissions. Data may be encoded in signal transitions. For a given bit of the input bitstream, the encoding circuit 108 may generate the set of data signals $d_A$, $d_B$, and $d_C$ (or equivalently the set of transmission bits A, B, and C) based on the bit and a previous set of transmitted data signals $d_{A,prev}$, $d_{B,prev}$, and $d_{C,prev}$ (or equivalently a previous set of transmission bits $A_{prev}$, $B_{prev}$, and $C_{prev}$). As an example, when a bit is encoded and a corresponding set of data signals is transmitted in each clock cycle, the previous set of data signals $d_{A,prev}$, $d_{B,prev}$, and $d_{C,prev}$ is the set of data signals transmitted over the wires 118A-C during a clock cycle n−1 temporally adjacent to and preceding a clock cycle n in which the set of data signals $d_A$, $d_B$, and $d_C$ is to be transmitted over the wires 118A-C. In this example, for a next bit of the input bitstream associated with a clock cycle n+1, the encoding circuit 108 may generate a set of data signals based on the next bit and the set of data signals transmitted at clock cycle n.

The decoding circuit 112 may receive the set of data signals $d_A$, $d_B$, and $d_C$ via the wires 118A-C and determine the bit of the input bitstream based on the set of data signals $d_A$, $d_B$, and do and the previous set of received data signals $d_{A,prev}$, $d_{B,prev}$, and $d_{C,prev}$. In this regard, the encoding circuit 108 and the decoding circuit 112 may include respective memory and/or may be coupled to respective memory that stores the previous set of transmission bits, the previous set of data signals, and/or any information indicative of the previous set of transmission bits or data signals to facilitate their respective encoding and decoding functionality.

In some aspects, the set of data signals $d_A$, $d_B$, and $d_C$ (or equivalently the set of transmission bits A, B, and C) may collectively provide a state associated with the encoding circuit 108. As such, in various embodiments, for a bit associated with a clock cycle n, a value of the bit is encoded in a transition from a state provided by the set of data signals $d_{A,prev}$, $d_{B,prev}$, and $d_{C,prev}$ associated with the clock cycle n−1 to a state provided by the set of data signals $d_A$, $d_B$, and $d_C$ associated with the clock cycle n. A state associated with the decoding circuit 112 may similarly be provided by the set of data signals $d_A$, $d_B$, and $d_C$ (or equivalently the set of transmission bits A, B, and C).

Figure 2:
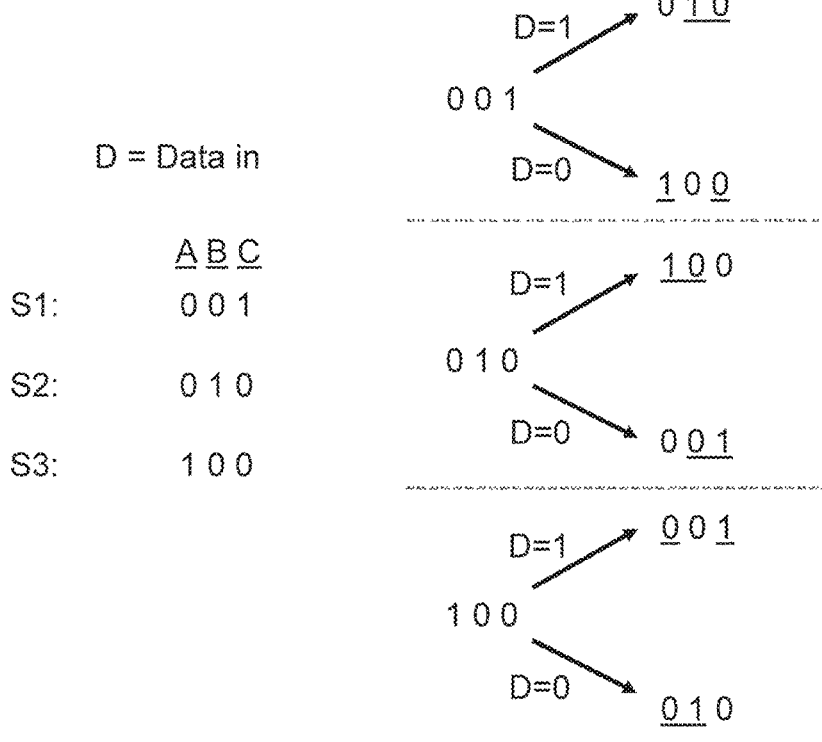
FIG. 2 illustrates an example encoding scheme defined for encoding a bit of data in a state transition in accordance with one or more embodiments of the disclosure.

FIG. 2 illustrates an example encoding scheme defined for encoding a bit of data in a state transition in accordance with one or more embodiments of the disclosure. For explanatory purposes, the encoding scheme is described herein with reference to the network environment 102 of FIG. 1, although the encoding scheme may be utilized with other network environments (e.g., other encoder-decoder architectures/environments). The transmission bits A, B, and C may collectively define states 001, 010, and 100 of the encoding circuit 108, which are arbitrarily denoted as states $S_1$, $S_2$, and $S_3$. An input bit D may cause a transition from one of these three states to another of these three states. In the encoding scheme of FIG. 2, each transition causes two of the transmission bits (e.g., and corresponding signals on two of the wires 118A-C) to change differentially, and a third of the transmission bits (e.g., and a corresponding signal on a remaining wire of the wires 118A-C) does not change.

The encoding scheme of FIG. 2 may be represented by the following state transition map/equations:

$$A'=B \cdot D + C \cdot D/$$

$$B'=A \cdot D/ + C \cdot D$$

$$C'=A \cdot D + B \cdot D/$$

where A, B, and C are current values of the transmission bits and provide a current state; A', B', and C' are next values of the transmission bits and provide a next state; and / represents an inversion (e.g., D/=1 when D=0 and D/=0 when D=1).

As a first example transition, for the state 001 (also denoted as state $S_1$), an input bit of 1 causes a transition to the state 010, in which the transmission bits B and C form a differential pair that differentially transitions (as shown using underlining in FIG. 2) and the transmission bit A remains unchanged. An input bit of 0 causes a transition to the state 100, in which the transmission bits A and C form a differential pair that differentially transitions (as shown using underlining in FIG. 2) and the transmission bit B remains unchanged.

As a second example transition, for the state 010 (also denoted as state $S_2$), an input bit of 1 causes a transition to the state 100, in which the transmission bits A and B form a differential pair that differentially transitions (as shown using underlining in FIG. 2) and the transmission bit C remains unchanged. An input bit of 0 causes a transition to the state 001, in which the transmission bits B and C form a differential pair that differentially transitions (as shown using underlining in FIG. 2) and the transmission bit A remains unchanged.

As a third example transition, for the state 100 (also denoted as state $S_3$), an input bit of 1 causes a transition to the state 001, in which the transmission bits A and C form a differential pair that differentially transitions (as shown using underlining in FIG. 2) and the transmission bit B remains unchanged. An input bit of 0 causes a transition to the state 010, in which the transmission bits A and B form a differential pair that differentially transitions (as shown using underlining in FIG. 2) and the transmission bit C remains unchanged.

It is noted that the encoding scheme of FIG. 2 is provided by way of non-limiting example. For example, rather than transitioning from a state 001 to 010 when an input bit is 1 and 100 when an input bit is 0, an input bit of 1 may instead transition the state 001 to the state 100 and an input bit of 0 may transition the state 001 to the state 010. Furthermore, although FIG. 2 shows an encoding scheme in which all states associated with the encoding circuit 108 have two transmission bits associated with a zero and one transmission bit associated with a one, in other implementations all states associated with the encoding circuit 108 may have two transmission bits associated with a one and one transmission bit associated with a zero.

Figure 3:
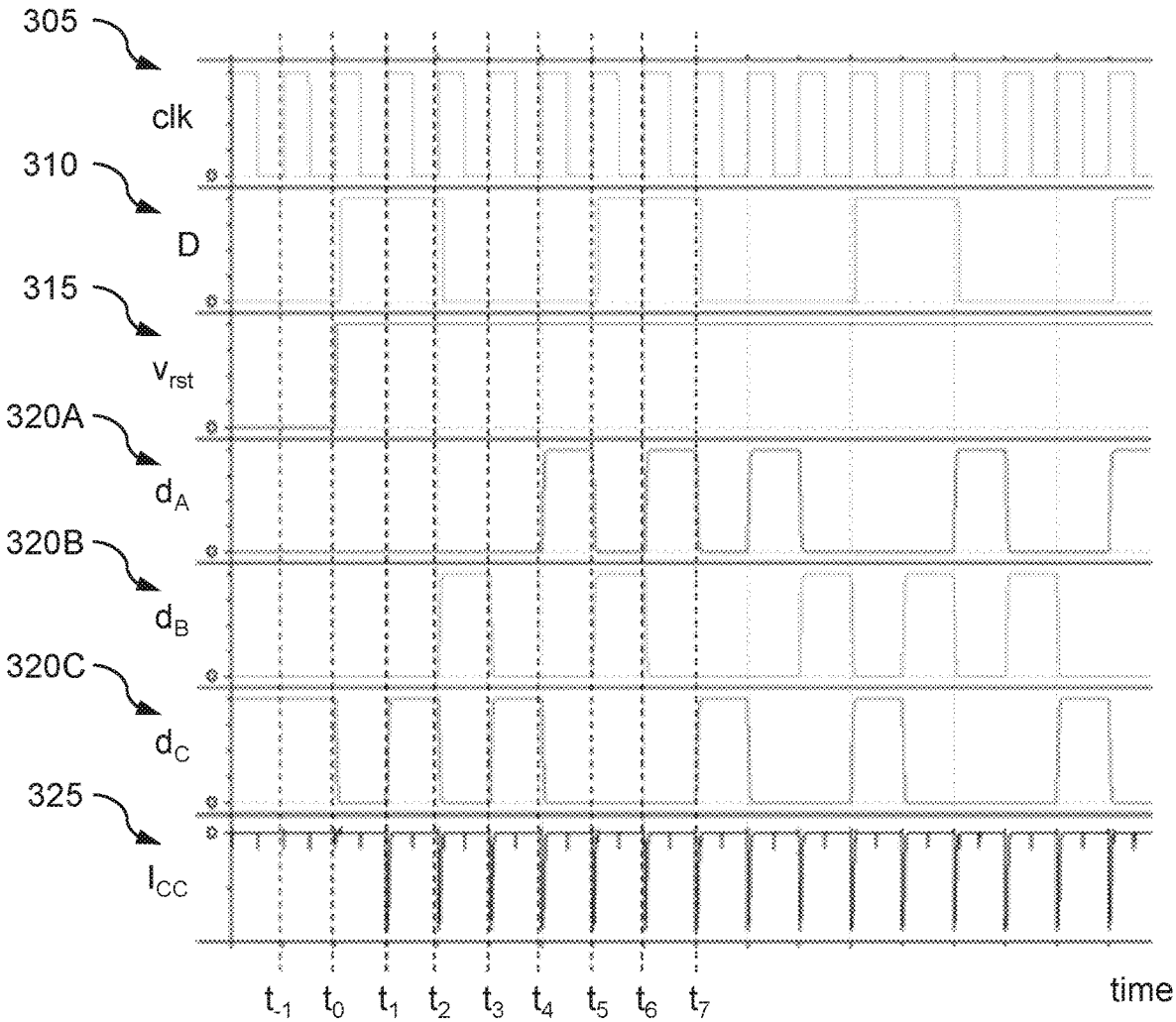
FIG. 3 illustrates example signal diagrams over time in relation to the encoding scheme of FIG. 2 in accordance with one or more embodiments of the disclosure.

FIG. 3 illustrates example signal diagrams 305, 310, 315, 320A-C, and 325 over time in relation to the encoding scheme of FIG. 2 in accordance with one or more embodiments of the disclosure. The signal diagram 305 provides clock pulses over time associated with the clock signal clk. The signal diagram 310 provides a logic level (e.g., 0 for logic low and 1 for logic high) of the input data bit D over time. The signal diagram 315 provides a signal level of a signal $v_{rst}$ (e.g., referred to as a reset signal or an initiation/ initialization signal) over time associated with operation of a system including the encoding circuit 108. The signal $v_{rst}$ may be at a level corresponding to a logic low when the encoding circuit 108 (e.g., a system including the encoding circuit 108) is not operated to encode a bitstream and at a level corresponding to a logic high when the encoding circuit 108 is operated to encode a bitstream. The signal diagrams 320A, 320B, and 320C provide a signal level (e.g., voltage level) over time of the data signals $d_A$, $d_B$, and $d_C$, respectively. In some cases, the signal level associated with the data signals $d_A$, $d_B$, and $d_C$ may be CMOS levels. In some cases, signal swings associated with transitioning between signal levels may involve full CMOS signal swings. The signal diagram 325 provides a signal level (e.g., current level) over time of a current $I_{CC}$ associated with power supplied by the power supply 122. The current $I_{CC}$ may be provided to transition the data signals $d_A$, $d_B$, and/or do to their appropriate signal levels.

Time instances $t_{-1}$, $t_0$, $t_1$, $t_2$, $t_3$, $t_4$, $t_5$, and so forth each provide a start of a respective clock cycle (e.g., a rising edge of a clock pulse) associated with the clock signal clk. At $t=t_{-1}^+$ (e.g., a time instance around and slightly after $t_{-1}$), the signal level of $v_{rst}$ is at a level corresponding to a logic low and thus encoding is not being performed. At $t=t_0^+$, to initiate encoding operation, the signal level of $v_{rst}$ is transitioned to a level corresponding to a logic high. Setting the signal level of $v_{rst}$ to the logic high state may cause (e.g., for initialization of the encoding circuit 108) the encoding circuit 108 to be set to a known state and a data input to be set to a predetermined level. As a non-limiting example, the known state may be 000 and the data input D may be a value 1 as shown in the signal diagrams 310, 320A, 320B, and 320C between $t=t_0$ and $t=t_1$. With encoding initiated, the data signals $d_A$, $d_B$, and $d_C$ (and the corresponding transmission bits A, B, and C) may be set to an initial state (e.g., transition from the known state to the initial state) at around $t=t_1$ to start a state machine associated with the encoding circuit 108. In FIG. 3, the initial state of the encoder circuit 105 is an allowed/valid state 001, although in other implementations any one of the other two allowed/valid states may be set as the initial state.

Between $t_1$ and $t_2$, the encoding circuit 108 is at the initial state 001 and receives an input bit having a value 1, thus causing a transition to the state 010 at around $t_2$. This input bit of 1 may be considered a first/initial bit of an input bitstream to be encoded, with this input bit being encoded based on the transition from the initial state 001 to the state 010. In this regard, the initial bit causes a transition from the initial state to the next state 010. A spike of the current $I_{CC}$ at around $t=t_2$ changes the data signals $d_B$ and do (e.g., selectively charges or discharges the wires 118B and 118C) to appropriate signal levels associated with the state 010. The transitioning of the data signals $d_B$ and do may be referred to as a differential transition. In some cases, the differential transition may be a full CMOS-level differential transition. In some cases, other electrical single-ended signaling methods may be used to generate the differential signals to effectuate the differential transition. The data signal $d_A$ does not change (e.g., the wire 118A remains static). Between $t_2$ and $t_3$, the encoding circuit 108 is at the state 010 and receives an input bit having a value of 0, thus causing a transition to the state 001 at around $t_3$. A spike of the current $I_{CC}$ at around $t=t_3$ changes (e.g., differentially transitions) the data signals $d_B$ and $d_C$ to appropriate signal levels associated with the state 001. The data signal $d_A$ does not change (e.g., the wire 118A remains static). Between $t_3$ and $t_4$, the encoding circuit 108 is at the state 001 and receives an input bit having a value of 0, thus causing a transition to the state 100 at around $t_4$. A spike of the current $I_{CC}$ at around $t=t_4$ changes (e.g., differentially transitions) the data signals $d_A$ and $d_C$ to appropriate signal levels associated with the state 100. The data signal $d_B$ does not change (e.g., the wire 118B remains static).

Between $t_4$ and $t_5$, the encoding circuit 108 is at the state 100 and receives an input bit having a value of 0, thus causing a transition to the state 010 at around $t_5$. A spike of the current $I_{CC}$ at around $t=t_5$ changes (e.g., differentially transitions) the data signals $d_A$ and $d_B$ to appropriate signal levels associated with the state 010. The data signal $d_C$ does not change (e.g., the wire 118C remains static). Between $t_5$ and $t_6$, the encoding circuit 108 is at the state 010 and receives an input bit having a value of 1, thus causing a transition to the state 100 at around $t_6$. A spike of the current $I_{CC}$ at around $t=t_e$ changes (e.g., differentially transitions) the data signals $d_A$ and $d_B$ to appropriate signal levels associated with the state 100. The data signal $d_C$ does not change (e.g., the wire 118C remains static). Between $t_e$ and $t_7$, the encoding circuit 108 is at the state 100 and receives an input bit having a value of 1, thus causing a transition to the state 001 at around $t_7$. A spike of the current $I_{CC}$ is provided at around $t=t_7$ changes (e.g., differentially transitions) the data signals $d_A$ and $d_C$ to appropriate signal levels associated with the state 001. The data signal $d_B$ does not change (e.g., the wire 118B remains static). Additional transitions occur in subsequent clock cycles shown in FIG. 3.

As shown by the signal diagram 325, spikes of the current $I_{CC}$ represent power provided by the power supply 122 to charge or discharge two of the wires 118A-C in response to a state transition during each clock cycle (e.g., at around $t_2$, $t_3$, $t_4$, and so forth). In the signal diagram 325, each state transition is associated with transitioning the data signals $d_A$, $d_B$, and $d_C$ by inverting two of the data signals (e.g., differentially transitioning two of the data signals) and leaving the third data signal unchanged, such that the data signals $d_A$, $d_B$, and $d_C$ are at appropriate signal levels associated with a desired state. In this regard, every clock cycle/pulse is associated with a two-wire differential signal. Every clock cycle is associated with a state transition that, in turn, is associated with a substantially/nominally the same spike in the signal level of the current $I_{CC}$. Thus, from the point of view of a system power bus providing the current $I_{CC}$ (e.g., which may be monitored by an adversary), no data information (e.g., or equivalently the same information pertaining to the spike) is presented on the power bus during each clock cycle. As such, even if the spike at $t=t_1$, $t_2$, $t_3$, and so forth of each clock cycle were considered to be leakage information, an adversary is unable to determine the data being communicated (e.g., the input bit D, the data signals $d_A$, $d_B$, and $d_C$, or the transmission bits A, B, and C) using the leakage information extracted from the power bus.

Figure 4:
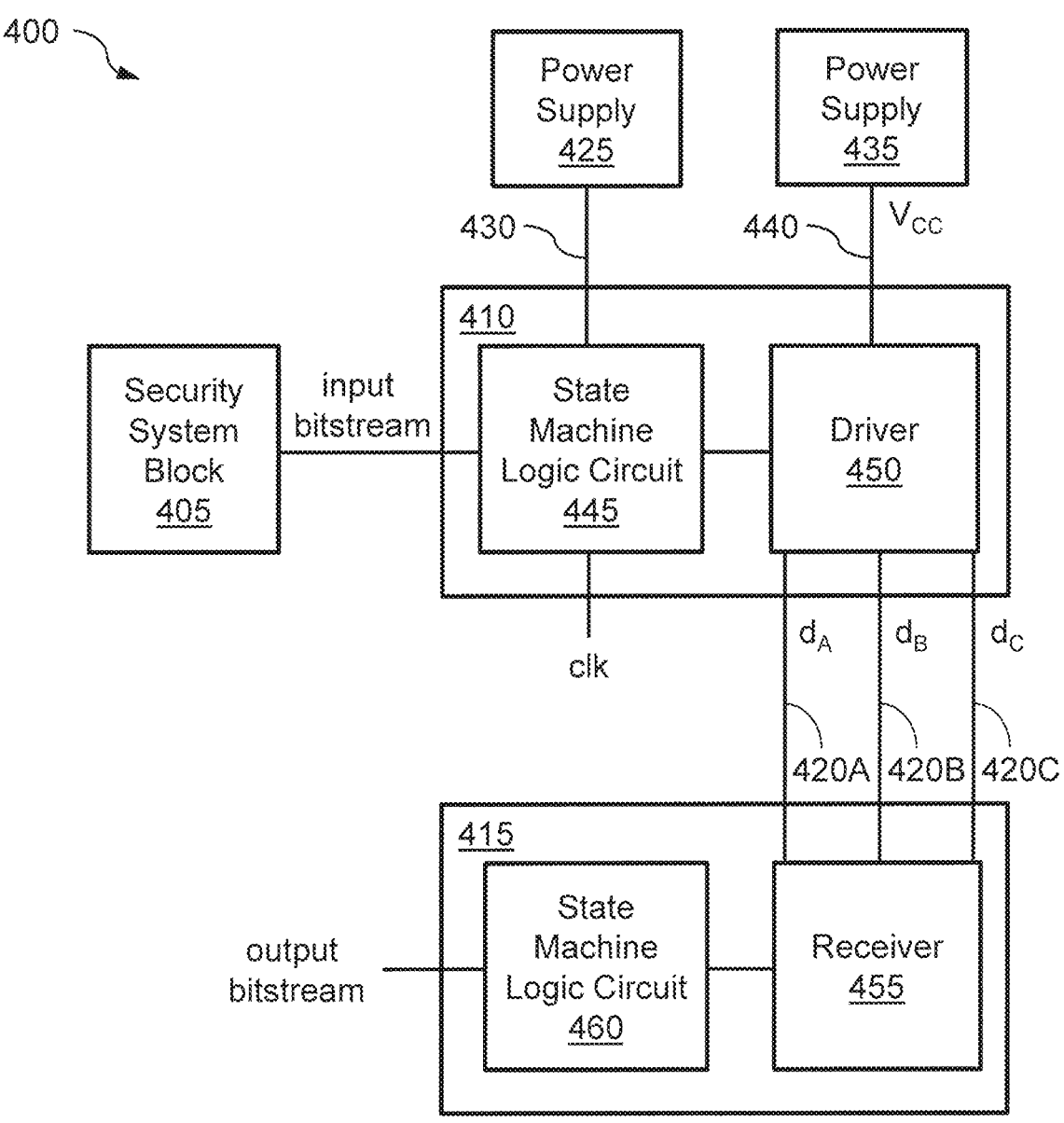
FIG. 4 illustrates an example network environment in which data is communicated in accordance with one or more embodiments of the disclosure.

FIG. 4 illustrates an example network environment 400 in which data is communicated in accordance with one or more embodiments of the disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the network environment 400 may be, may include, or may be a part of, the network environment 102 of FIG. 1. The description of the network environment 102 of FIG. 1 generally applies to the network environment 400 of FIG. 4, with examples of differences and other description provided herein.

The network environment 400 includes a security system block 405, an encoding circuit 410, a decoding circuit 415, wires 420A-C, a power supply 425, a power supply line 430, a power supply 435, and a power supply line 440. The encoding circuit 410 and the decoding circuit 415 may be implemented on a single chip or multiple chips. As one example, the security system block 405, the encoding circuit 410, and the decoding circuit 415 may be implemented on the same chip such that the wires 420A-C may provide intra-chip and/or intra-device connections (e.g., to facilitate block to block communication across a chip). As another example, the security system block 405 and the encoding circuit 410 may be implemented on one chip and the decoding circuit 415 may be implemented on another chip such that the wires 420A-C may provide inter-chip and/or inter-device connections.

The security system block 405 may be implemented using hardware, software, or combinations of hardware and software. In some aspects, the security system block 405 may be implemented as a hard intellectual property (IP) core resource to provide securable and/or non-volatile storage of data. The security system block 405 may include multiple differentiated sectors, such as one or more device key sectors (e.g., an advanced encryption standard (AES) key sector and a separate key/key pair sector), one or more user flash memory (UFM) sectors, and/or other defined storage sectors. Device key sectors may be used to store encryption/decryption keys, public/private keys, and/or other security keys. In some cases, such as when the security system block 405 is provided in a programmable logic device, the security system block 405 may include configuration image sectors for storing a configuration for the programmable logic device. Alternatively or in addition, other types of secure data content associated with the security system block 405 may include software revisions and/or secure personal data. Data stored in the security system block 405 may be provided as an input bitstream to the encoding circuit 410.

The encoding circuit 410 includes a state machine logic circuit 445 and a driver 450 (e.g., also referred to as a driver circuit). The encoding circuit 410 may operate according to a clock clk. It is noted that in some cases the clock clk may be utilized by other components of the encoding circuit 410 and/or other components of a system that includes the encoding circuit 410. In some cases, the encoding circuit 410 may encode one bit of the input bitstream during each clock cycle.

The state machine logic circuit 445 may receive a bit of the input bitstream, determine a current state (e.g., provided by transmission bits A, B, and C) associated with the encoding circuit 410 based on the bit and a previous state (e.g., provided by transmission bits $A_{prev}$, $B_{prev}$, and $C_{prev}$) associated with the encoding circuit 410 (or, equivalently, associated with the state machine logic circuit 445). The state machine logic circuit 445 may include memory and/or may be coupled to memory that stores at least the previous state associated with the state machine logic circuit 445. The power supply 425 may supply power (e.g., voltages and/or currents) to at least the state machine logic circuit 445 via the power supply line 430.

The driver 450 may receive the current state from the state machine logic circuit 445, generate data signals $d_A$, $d_B$, and $d_C$ based on the current state, and transmit the data signals $d_A$, $d_B$, and $d_C$ over the wires 420A, 420B, and 420C, respectively. In some cases, the state machine logic circuit 445 may provide the transmission bits A, B, and C to the driver 450, and the driver 450 may drive the transmission bits A, B, and/or C as needed to appropriate signal levels for transmission over the wires 420A-C. In an embodiment, a transition from the previous state to the current state for a given encoding scheme may cause the driver 450 to change a signal level associated with only a subset of the data signals $d_A$, $d_B$, and $d_C$, whereas a signal level associated with the remaining data signal(s) is maintained by the driver 450 (e.g., the remaining data signal(s) has the same signal level across multiple consecutive clock cycles).

An example of an encoding scheme performed by the encoding circuit 108 is described with respect to FIG. 2. Examples of signal diagrams associated with operation of the encoding circuit 410 is described with respect to FIG. 3. With respect to the examples provided in FIGS. 2 and 3, for any transition, the driver 450 may differentially transition two of the three data signals and leave the third data signal unchanged. In an embodiment, the encoding circuit 410 may be, may include, or may be a part of the encoding circuit 108 of FIG. 1.

The power supply 435 may supply power (e.g., voltages and/or currents) to at least the driver 450 via the power supply line 440. In an aspect, the power supply line 440 may provide a common supply line(s) onto which the power supply 435 provides power. In an embodiment, the power supply 435 and the power supply line 440 may be, may include, or may be a part of the power supply 122 and the power line 128, respectively, of FIG. 1. In some embodiments, encoding schemes and associated decoding schemes described herein may be used to mitigate/suppress information leakage associated with the power supply line 440 (and/or other similar power supply lines) that may be subject to side channel attacks. In some cases, the power supply 425 is generally part of a different on-chip supply associated with a lower voltage than the power supply 435. The power supply 425 may have a lower voltage used for processor core transistors, not input/output (I/O) drivers. It is noted that the power supply lines 430 and/or 440 may provide power to other circuitry in FIG. 4 and/or other circuitry not shown in FIG. 4, and/or other power supplies and associated power supply lines not shown in FIG. 4 may be used to provide power to other circuitry in FIG. 4.

The decoding circuit 415 includes a receiver 455 (e.g., also referred to as a receiver circuit) and a state machine logic circuit 460. For any given bit encoded by the encoding circuit 410, the receiver 455 of the decoding circuit 415 may receive the data signals $d_A$, $d_B$, and $d_C$ via the wires 420A-C and determine a current state (e.g., the transmission bits) associated with the data signals $d_A$, $d_B$, and $d_C$. The state machine logic circuit 460 may receive the current state (or information indicative of the current state) from the receiver 455 and may determine a value of the bit that caused a transition from the previous state to the current state. The state machine logic circuit 460 may include memory and/or may be coupled to memory that stores at least the previous state associated with the state machine logic circuit 460. The state machine logic circuit 460 may provide the bit as part of an output data stream to one or more components downstream of the state machine logic circuit 460 that may utilize the output data stream. Although not shown in FIG. 4, the decoding circuit 415 may also operate according to a clock signal. In some aspects, to facilitate encoding and decoding, the clock signal for the decoding circuit 415 may be synchronized with and/or have the same clock frequency as the clock signal clk associated with the encoding circuit 410 (e.g., to avoid data loss). In some cases, differences in system clock rates (e.g., enabling packet bursts at higher frequencies) may be adjusted as part of the security system block 405 and/or post-processed at the output data stream.

Figure 5A:
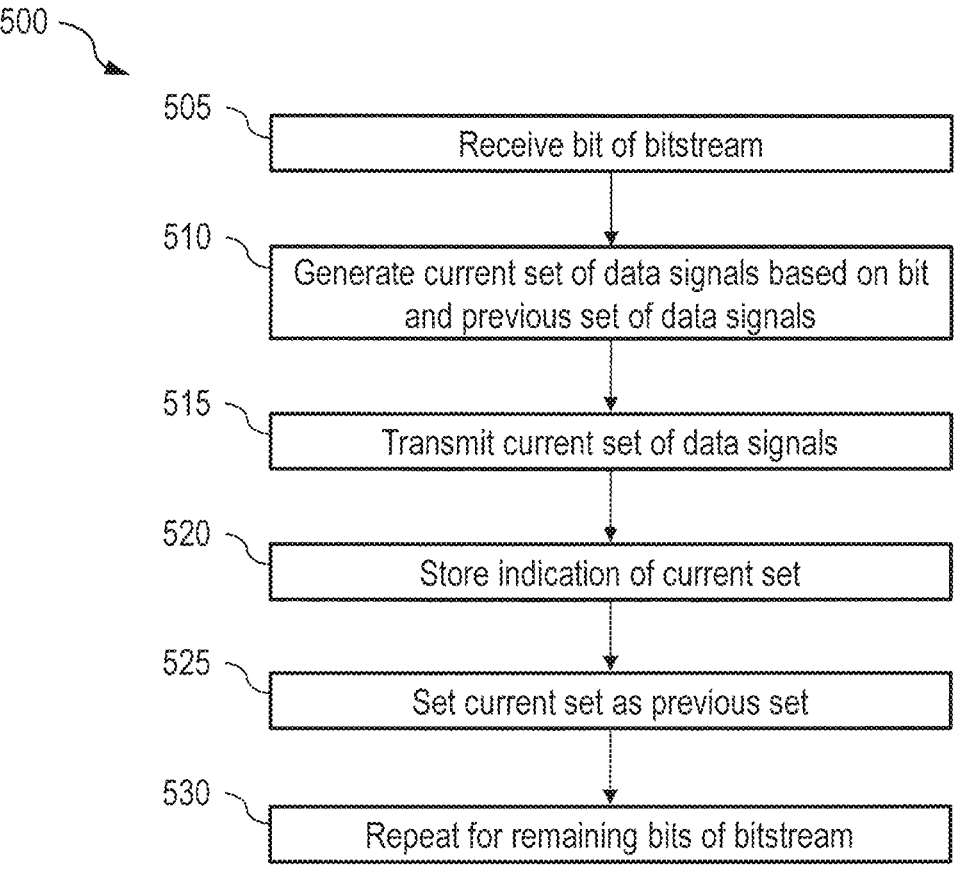
FIG. 5A illustrates a flow diagram of an example encoding process for facilitating information leakage mitigation in accordance with one or more embodiments of the disclosure.

FIG. 5A illustrates a flow diagram of an example encoding process 500 for facilitating information leakage mitigation in accordance with one or more embodiments of the disclosure. For explanatory purposes, the example encoding process 500 is described herein with reference to the network environment 102 of FIG. 1, although the example encoding process 500 may be utilized with other network environments. Note that one or more operations may be combined, omitted, and/or performed in a different order as desired.

At block 505, the encoding circuit 108 receives a bit of the input bitstream. As one example, the input bitstream may include data associated with a key exchange, a software revision, and/or personal data. At block 510, the encoding circuit 108 generates a current set of data signals $d_A$, $d_B$, and $d_C$ based on the received bit and a previous set of data signals $d_{A,prev}$, $d_{B,prev}$, and $d_{C,prev}$. In some cases, the encoding circuit 108 may determine its current state (corresponding to transmission bits A, B, and C) based on its previous state (corresponding to transmission bits $A_{prev}$, $B_{prev}$, and $C_{prev}$) and the received bit, and convert/translate the current state to the current set of data signals $d_A$, $d_B$, and $d_C$ having appropriate signal levels (e.g., CMOS levels). In some embodiments, by using encoding schemes in which a state transition occurs with each received input data bit (e.g., regardless of whether the bit is a 0 or 1) and each state being associated with a predetermined number of bit(s) at a first logic level and a predetermined number of transmission bit(s) at a second logic level, every transition gives the same result (e.g., a two-wire differential transition and a third wire remaining static) from the point of view of a system power bus (e.g., which may be monitored by an attacker) and thus no data information (e.g., or equivalently the same information) is presented on the power bus for each transition (e.g., regardless of state, state transition, and input bit). In some cases, each clock cycle is associated with a single state transition and encoding a single bit.

At block 515, the encoding circuit 108 transmits the current set of data signals $d_A$, $d_B$, and do over the wires 118A, 118B, and 118C, respectively. At block 520, the encoding circuit 108 stores an indication of the current set of data signals $d_A$, $d_B$, and $d_C$. For example, the encoding circuit 108 may store the transmission bits A, B, and C. The encoding circuit 108 may store the current set in memory of the encoding circuit 108 and/or memory coupled to the encoding circuit 108. At block 525, the encoding circuit 108 sets the current set of data signals $d_A$, $d_B$, and $d_C$ as the previous set of data signals $d_{A,prev}$, $d_{B,prev}$, and $d_{C,prev}$ for processing a next bit of the input bitstream. At block 530, the encoding circuit 108 performs blocks 505, 510, 515, 520, and 525 until all bits of the bitstream are processed.

Figure 5B:
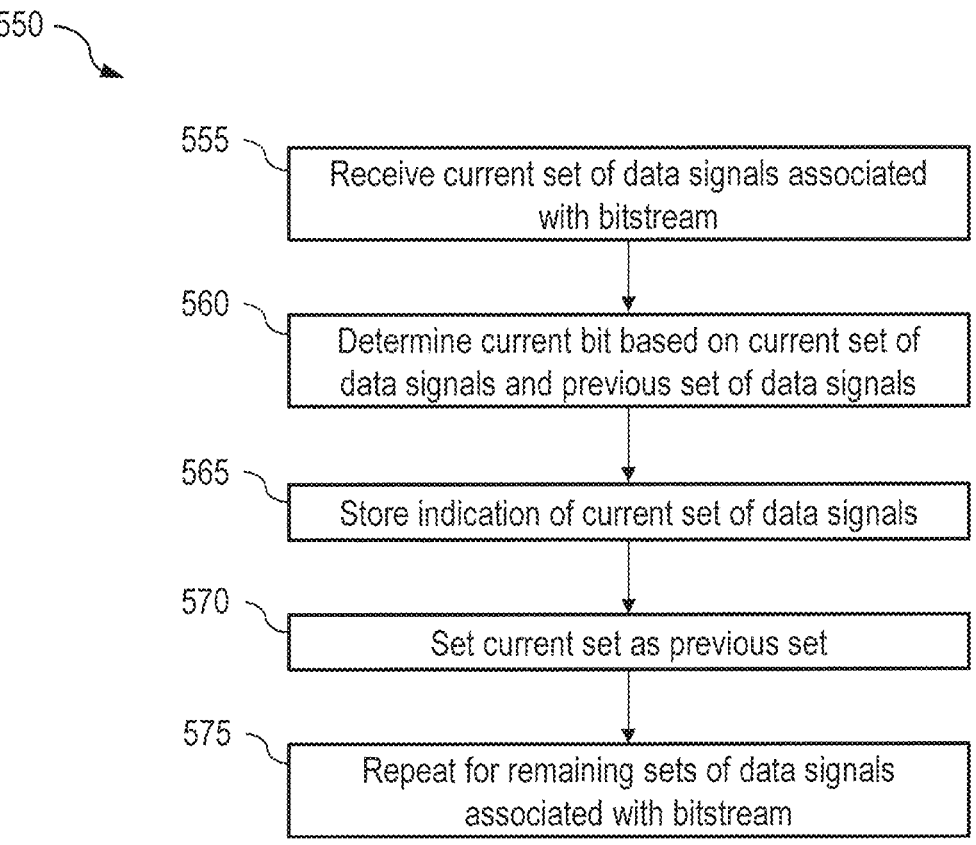
FIG. 5B illustrates a flow diagram of an example decoding process in accordance with one or more embodiments of the disclosure.

FIG. 5B illustrates a flow diagram of an example decoding process 550 in accordance with one or more embodiments of the disclosure. For explanatory purposes, the example decoding process 550 is described herein with reference to the network environment 102 of FIG. 1, although the example decoding process 550 may be utilized with other network environments. Furthermore, for explanatory purposes, the example decoding process 550 is used to decode data encoded according to the example encoding process 500 of FIG. 5A. Note that one or more operations may be combined, omitted, and/or performed in a different order as desired.

At block 555, the decoding circuit 112 receives the current set of data signals $d_A$, $d_B$, and $d_C$ associated with a bit of a bitstream over the wires 118A, 118B, and 118C, respectively. At block 560, the decoding circuit 112 determines a current bit based on the current set of data signals $d_A$, $d_B$, and $d_C$ and the previous set of data signals $d_{A,prev}$, $d_{B,prev}$, and $d_{C,prev}$. In some cases, the decoding circuit 112 may convert/translate the current set of data signals $d_A$, $d_B$, and do to corresponding transmission bits A, B, and C to obtain its current state, and determine the current bit based on its current state and its previous state (corresponding to transmission bits $A_{prev}$, $B_{prev}$, and $C_{prev}$). The decoding circuit 112 may store a state of the decoding circuit 112 in memory of the decoding circuit 112 and/or memory coupled to the decoding circuit 112. In some cases, each clock cycle is associated with decoding of a single bit.

At block 565, the decoding circuit 112 stores an indication of the current set of data signals $d_A$, $d_B$, and $d_C$. For example, the decoding circuit 112 may store the transmission bits A, B, and C. At block 570, the decoding circuit 112 sets the current set of data signals $d_A$, $d_B$, and do as the previous set of data signals $d_{A,prev}$, $d_{B,prev}$, and $d_{C,prev}$ for processing a next set of data signals (e.g., associated with a next clock cycle on the encoder-side) received over the wires 118A-C. At block 575, the decoding circuit 112 performs blocks 555, 560, 565, and 570 until all bits of the bitstream are processed.

FIG. 6A illustrates a flow diagram of an example encoding process 600 for facilitating information leakage mitigation in accordance with one or more embodiments of the disclosure.

For explanatory purposes, the example encoding process 600 is described herein with reference to the network environment 102 of FIG. 1, although the example encoding process 600 may be utilized with other network environments. Note that one or more operations may be combined, omitted, and/or performed in a different order as desired. In some aspects, an encoding process may include one or more operations from the example encoding process 500 of FIG. 5A and/or one or more operations from the example encoding process 600 of FIG. 6A.

At block 605, the encoding circuit 108 receives a bit of the input bitstream. At block 610, the encoding circuit 108 transitions from a previous state (e.g., associated with transmission bits $A_{prev}$, $B_{prev}$, and $C_{prev}$ or, equivalently, data signals $d_{A,prev}$, $d_{B,prev}$, and $d_{C,prev}$) to a current state (e.g., associated with transmission bits A, B, and C or, equivalently, data signals $d_A$, $d_B$, and $d_C$) based on (e.g., in response to) the received bit. At block 615, the encoding circuit 108 inverts a differential pair of data signals from among the data signals $d_A$, $d_B$, and $d_C$ based on (e.g., according to) the current state. In this regard, in response to the transition, the encoding circuit 108 may determine the data signals $d_A$, $d_B$, and $d_C$ and identify the appropriate differential pair to invert from among the data signals $d_A$, $d_B$, and $d_C$ based on the current state. The differential pair may be inverted to obtain a differentially inverted/transitioned pair of signals. At block 620, the encoding circuit 108 maintains the remaining of the data signals $d_A$, $d_B$, and $d_C$. At block 625, the inverted differential pair and the remaining data signal are transmitted over the wires 118A-C. As an example, with reference to FIG. 2, if the previous state is 001 and the received bit D=1, then the current state is 010. The encoding circuit 108 may determine/identify, based on the previous state of 001 and the current state of 010, that the data signals $d_{B,prev}$ and $d_{C,prev}$ form the differential pair to be inverted and the data signal $d_{A,prev}$ is to be maintained. The data signals $d_{B,prev}$ and $d_{C,prev}$ on the wires 118B and 118C, respectively, are each inverted in response to the state transition to provide the data signals $d_B$ and do on the wires 118B and 118C, respectively. The data signal $d_{A,prev}$ on the wire 118A is maintained on the wire 118A in response to the state transition to provide the data signal $d_A$ on the wire 118A.

At block 630, the encoding circuit 108 stores an indication of the current state. The encoding circuit 108 may store the current state in memory of the encoding circuit 108 and/or memory coupled to the encoding circuit 108. In some cases, the transmission bits A, B, and C may be stored to represent the current state. At block 635, the encoding circuit 108 sets the current state as the previous state for processing a next bit of the input bitstream. At block 640, the encoding circuit 108 performs blocks 605, 610, 615, 620, 625, 630, and 635 until all bits of the bitstream are processed. In this regard, based on each input bit, the encoding circuit 108 may transition between two states (e.g., at block 610) according to the input bit and change or maintain the data signals on the wires 118A-C (e.g., at blocks 615 and 620) according to the associated state transition to provide the data signals on the wires 118A-C (e.g., at block 625). In some embodiments, to facilitate information leakage mitigation, a transition between any two states is associated with nominally/substantially the same power from the power supply 122 for inverting the differential pair (e.g., at block 615), such as shown in the signal diagram 325 in FIG. 3.

Figure 6B:
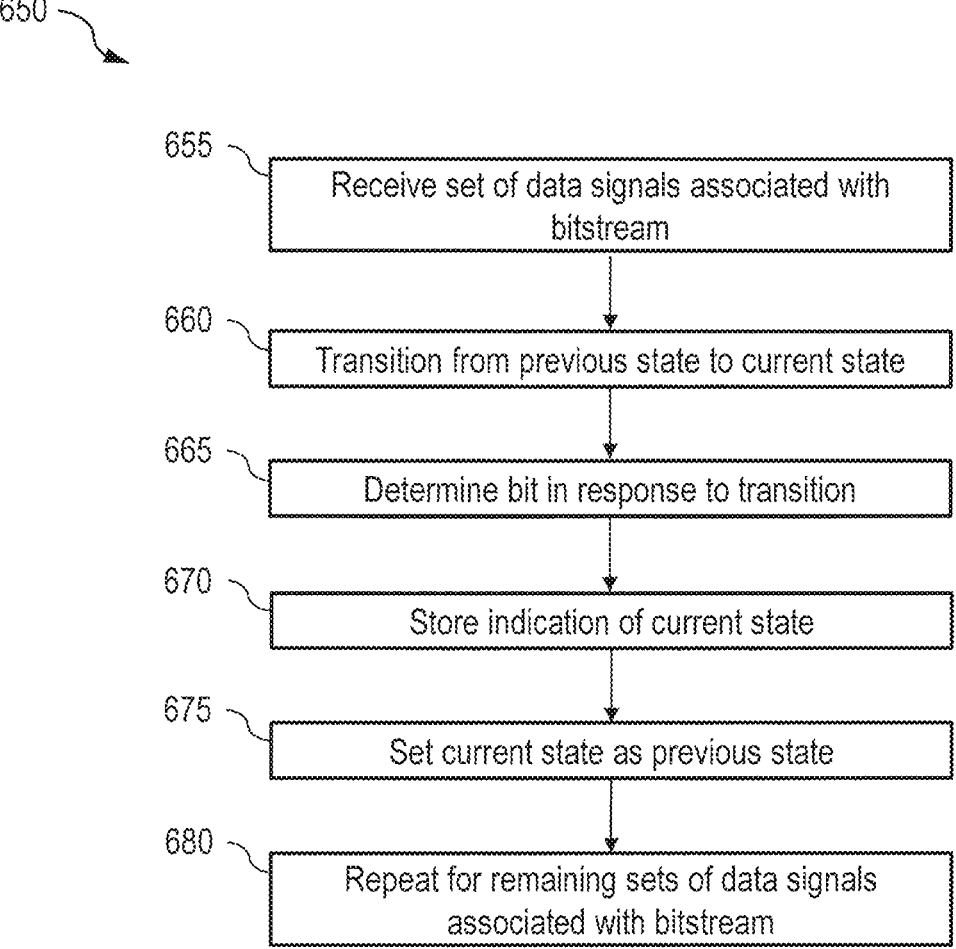
FIG. 6B illustrates a flow diagram of an example decoding process in accordance with one or more embodiments of the disclosure.

FIG. 6B illustrates a flow diagram of an example decoding process 650 in accordance with one or more embodiments of the disclosure. For explanatory purposes, the example decoding process 650 is described herein with reference to the network environment 102 of FIG. 1, although the example decoding process 650 may be utilized with other network environments. Furthermore, for explanatory purposes, the example decoding process 650 is used to decode data encoded according to the example encoding process 600 of FIG. 6. Note that one or more operations may be combined, omitted, and/or performed in a different order as desired. In some aspects, a decoding process may include one or more operations from the example decoding process 550 of FIG. 5B and/or one or more operations from the example encoding process 650 of FIG. 6B.

At block 655, the decoding circuit 112 receives the current set of data signals $d_A$, $d_B$, and do associated with a bit of a bitstream over the wires 118A, 118B, and 118C, respectively. At block 660, the decoding circuit 112 transitions from a previous state (e.g., associated with transmission bits $A_{prev}$, $B_{prev}$, and $C_{prev}$ or, equivalently, data signals $d_{A,prev}$, $d_{B,prev}$, and $d_{C,prev}$) to a current state (e.g., associated with transmission bits A, B, and C or, equivalently, data signals $d_A$, $d_B$, and $d_C$) based on (e.g., in response to) the current set of data signals. At block 665, the decoding circuit 112 determines a current bit based on the previous state and the current state. At block 670, the decoding circuit 112 stores an indication of the current state. In some cases, the transmission bits A, B, and C may be stored to represent the current state. At block 675, the decoding circuit 112 sets the current state as the previous state for processing a next set of data signals (e.g., associated with a next clock cycle on the encoder-side) received over the wires 118A-C. At block 680, the decoding circuit 112 performs blocks 655, 660, 665, 670, and 675 until all bits of the bitstream are processed. In some cases, each clock cycle of the decoding circuit 112 is associated with decoding the current set of data signals to obtain a single bit. It is noted that a clock cycle of the decoding circuit 112 may be the same or may be different from a clock cycle of the encoding circuit 108.

Techniques provided herein may be utilized to facilitate information leakage mitigation in wired communications, such as inter-chip communications, inter-device communications, intra-chip communications, intra-device communications, and/or generally any wired communications so long as signals having appropriate signal levels are utilized such that the signals can traverse over desired distances/lengths of wire. In some embodiments, techniques may utilized with programmable logic devices to facilitate information leakage mitigation. Routing resources of the programmable logic devices may be selectively programmed to implement desired data communication routes between components. In some aspects, routing resources may be programmed to implement wires for transmitting bitstreams, clock signals, data signals (e.g., $d_A$, $d_B$, and $d_C$), and/or other data.

Figure 7:
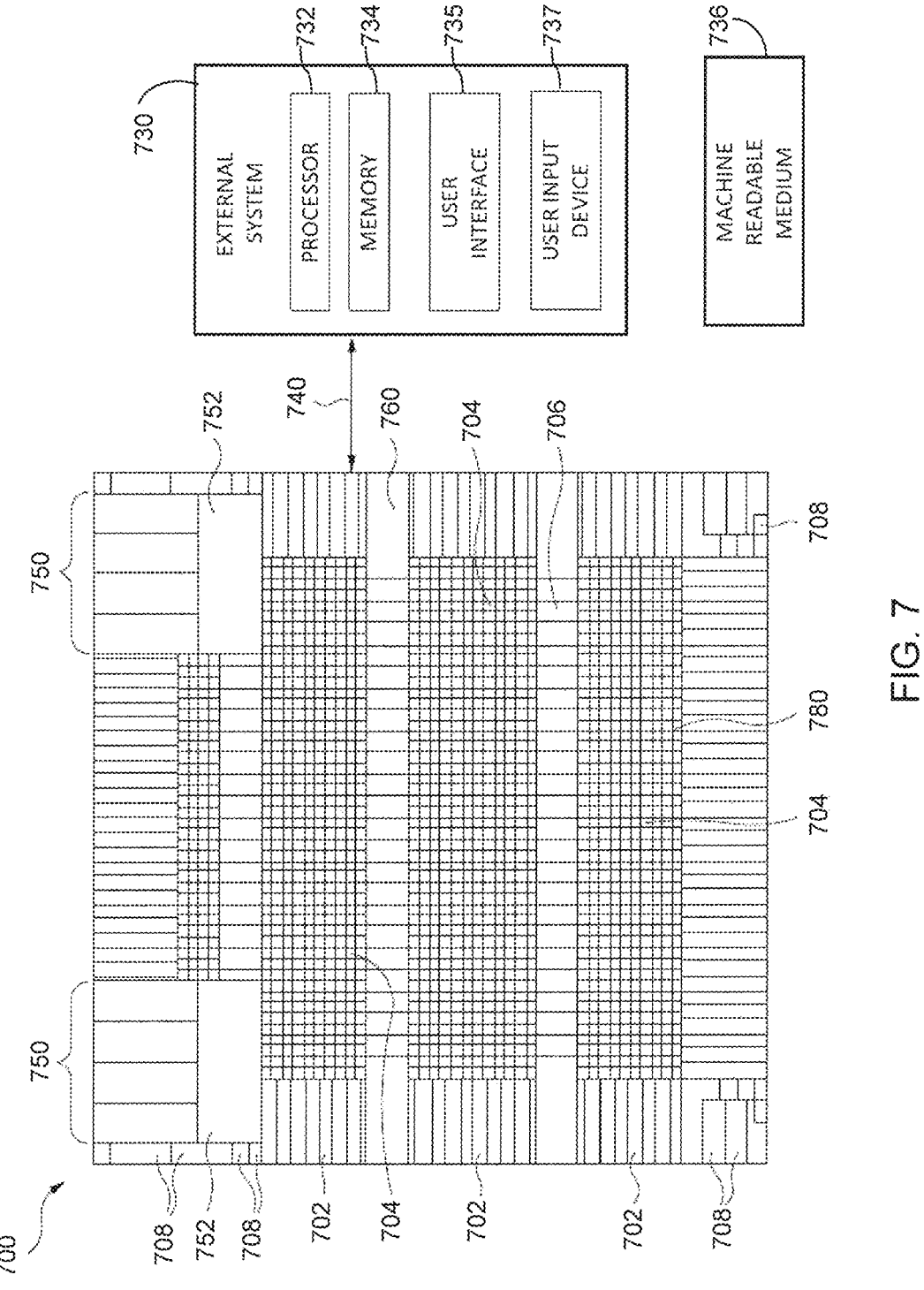
FIG. 7 illustrates a block diagram of a programmable logic device in accordance with one or more embodiments of the disclosure.

FIG. 7 illustrates a block diagram of a programmable logic device (PLD) 700 in accordance with one or more embodiments of the disclosure. In some embodiments, the encoding circuit 108, the decoding circuit 112, the security system block 405, the encoding circuit 410, and/or the decoding circuit 415 may be implemented in the PLD 700. In various embodiments, the PLD 700 may be implemented as a standalone device, for example, or may be embedded within a system on a chip (SOC), other logic devices, and/or other integrated circuit(s). The PLD 700 (e.g., a field programmable gate array (FPGA), a complex programmable logic device (CPLD), a field programmable system on a chip (FPSC), or other type of programmable device) generally includes I/O blocks 702 and logic blocks 704 (e.g., also referred to as programmable logic blocks (PLBs), programmable functional units (PFUs), or programmable logic cells (PLCs)). In some cases, the PLD 700 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, PFUs, or PLCs. In an aspect, the PLBs 704 may collectively form an integrated circuit (IC) core or logic core of the PLD 700. The I/O blocks 702 provide I/O functionality (e.g., to support one or more I/O and/or memory interface standards) for the PLD 700, while the PLBs 704 provide logic functionality (e.g., LUT-based logic) for the PLD 700. Additional I/O functionality may be provided by serializer/deserializer (SERDES) blocks 750 and physical coding sublayer (PCS) blocks 752. The PLD 700 may also include hard IP core blocks 760 to provide additional functionality (e.g., substantially predetermined functionality provided in hardware which may be configured with less programming than the PLBs 704).

The PLD 700 may include blocks of memory 706 (e.g., blocks of erasable programmable read-only memory (EE-PROM), block static RAM (SRAM), and/or flash memory), clock-related circuitry 708 (e.g., clock sources, phase-locked loop (PLL) circuits, delay-locked loop (DLL) circuits, and/or feedline interconnects), and/or various routing resources 780 (e.g., interconnect and appropriate switching circuits to provide paths for routing signals throughout the PLD 700, such as for clock signals, data signals, control signals, or others) as appropriate. In general, the various elements of the PLD 700 may be used to perform their intended functions for desired applications, as would be understood by one skilled in the art.

For example, certain of the I/O blocks 702 may be used for programming the memory 706 or transferring information (e.g., various types of user data and/or control signals) to/from the PLD 700. Other of the I/O blocks 702 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 702 may be included to receive configuration data and commands (e.g., over one or more connections) to configure the PLD 700 for its intended use and to support serial or parallel device configuration and information transfer with the SERDES blocks 750, PCS blocks 752, hard IP blocks 760, and/or PLBs 704 as appropriate. In another example, the routing resources 780 may be used to route connections between components, such as between I/O nodes of logic blocks 704. In some embodiments, such routing resources may include programmable elements (e.g., nodes where multiple routing resources intersect) that may be used to selectively form a signal path for a particular connection between components of the PLD 700 or between the PLD 700 and an external device for transporting/communicating data (e.g., using appropriately programmed I/O blocks 702). In some embodiments, the PLD 700 may be programmed to provide or facilitate encoding functionality, decoding functionality, and/or communication functionality within the PLD 700 and/or with other devices. In some embodiments, the routing resources 780 may be programmed to implement wires for communicating data to an encoding circuit (e.g., the encoding circuit 108 of FIG. 1), wires for communication clock signals to the encoding circuit, wires (e.g., the wires 118A-C) for communication data from the encoding circuit to a decoding circuit (e.g., the decoding circuit 112 of FIG. 1), and/or other wires.

It should be understood that the number and placement of the various elements are not limiting and may depend upon the desired application. For example, various elements may not be required for a desired application or design specification (e.g., for the type of programmable device selected). Furthermore, it should be understood that the elements are illustrated in block form for clarity and that various elements would typically be distributed throughout the PLD 700, such as in and between the PLBs 704, hard IP blocks 760, and routing resources 780 to perform their conventional functions (e.g., storing configuration data that configures the PLD 700 or providing interconnect structure within the PLD 700). For example, the routing resources 780 may be used for internal connections within each PLB 704 and/or between different PLBs 704. It should also be understood that the various embodiments disclosed herein are not limited to programmable logic devices, such as the PLD 700, and may be applied to various other types of programmable devices, as would be understood by one skilled in the art.

An external system 730 may be used to create a desired user configuration or design of the PLD 700 and generate corresponding configuration data to program (e.g., configure) the PLD 700. For example, to configure the PLD 700, the system 730 may provide such configuration data to one or more of the I/O blocks 702, PLBs 704, SERDES blocks 750, and/or other portions of the PLD 700. In this regard, the external system 730 may include a link 740 that connects to a programming port (e.g., SPI, JTAG) of the PLD 700 to facilitate transfer of the configuration data from the external system 730 to the PLD 700. As a result, the I/O blocks 702, PLBs 704, various of the routing resources 780, and any other appropriate components of the PLD 700 may be configured to operate in accordance with user-specified applications.

In the illustrated embodiment, the system 730 is implemented as a computer system. In this regard, the system 730 includes, for example, one or more processors 732 that may be configured to execute instructions, such as software instructions, provided in one or more memories 734 and/or stored in non-transitory form in one or more non-transitory machine readable media 736 (e.g., which may be internal or external to the system 730). For example, in some embodiments, the system 730 may run PLD configuration software, such as Lattice Diamond System Planner software available from Lattice Semiconductor Corporation to permit a user to create a desired configuration and generate corresponding configuration data to program the PLD 700. In this regard, in some cases, the system 730 and/or other external/remote system may be used for factory programming or remote programming (e.g., remote updating) of one or more PLDs (e.g., through a network), such as the PLD 700.

The configuration data may alternatively or in addition be stored on the PLD 700 (e.g., stored in a memory located within the PLD 700) and/or a separate/discrete memory of a system including the PLD 700 and the separate/discrete memory (e.g., a system within which the PLD 700 is operating). In some embodiments, the memory 706 of the PLD 700 may include non-volatile memory (e.g., flash memory) utilized to store the configuration data generated and provided to the memory 706 by the external system 730. During configuration of the PLD 700, the non-volatile memory may provide the configuration data via configuration paths and associated data lines to configure the various portions (e.g., I/O blocks 702, PLBs 704, SERDES blocks 750, routing resources 780, and/or other portions) of the PLD 700. In some cases, the configuration data may be stored in non-volatile memory external to the PLD 700 (e.g., on an external hard drive such as the memories 734 in the system 730). During configuration, the configuration data may be provided (e.g., loaded) from the external non-volatile memory into the PLD 700 to configure the PLD 700.

The system 730 also includes, for example, a user interface 735 (e.g., a screen or display) to display information to a user, and one or more user input devices 737 (e.g., a keyboard, mouse, trackball, touchscreen, and/or other device) to receive user commands or design entry to prepare a desired configuration of the PLD 700. In some embodiments, the user interface 735 may be adapted to display a netlist, a component placement, a connection routing, hardware description language (HDL) code, and/or other final and/or intermediary representations of a desired circuit design, for example.

Figure 8:
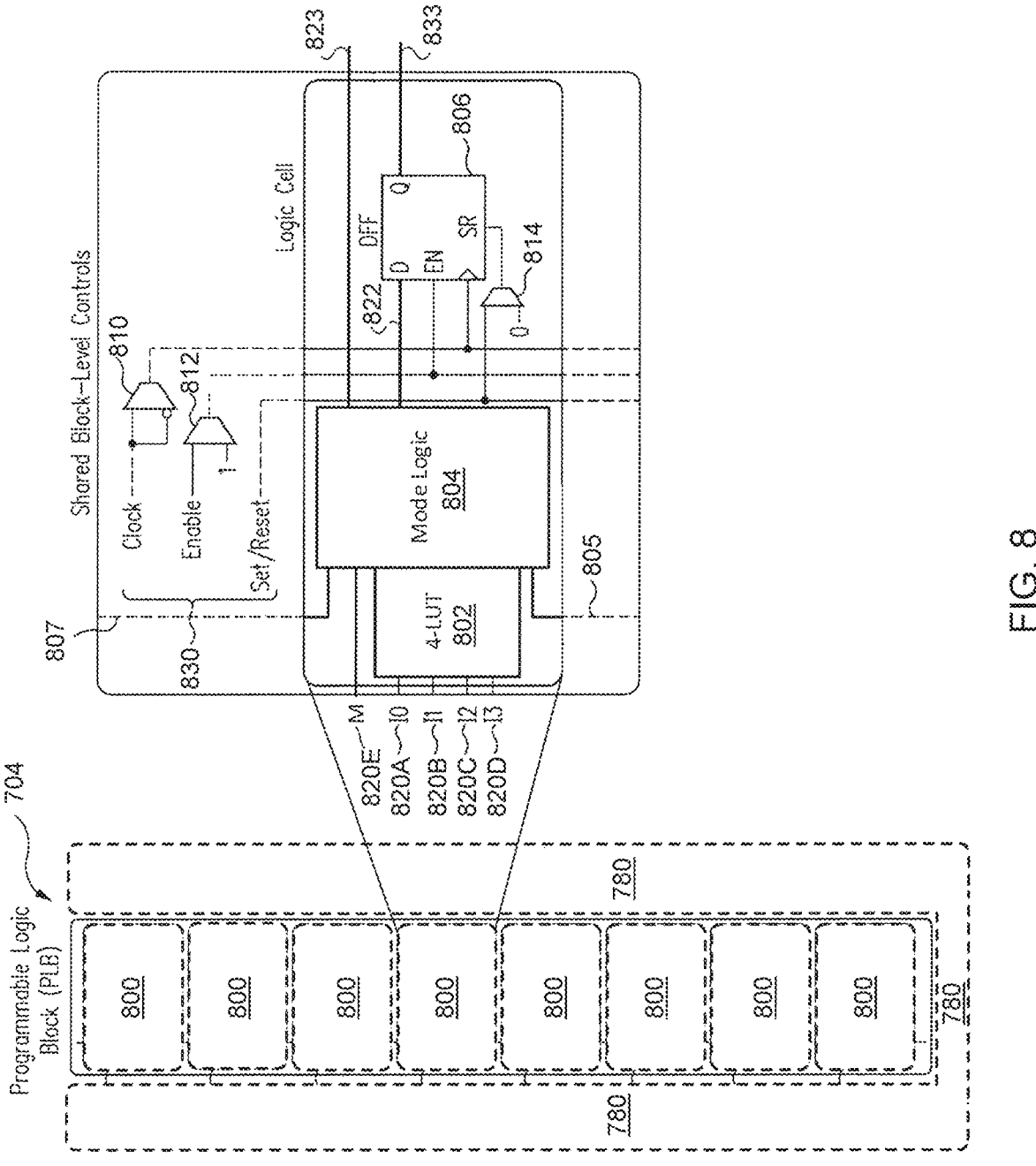
FIG. 8 illustrates a block diagram of a logic block of a programmable logic device in accordance with one or more embodiments of the disclosure.

FIG. 8 illustrates a block diagram of a logic block 704 of the PLD 700 in accordance with one or more embodiments of the disclosure. As discussed, the PLD 700 includes a plurality of logic blocks 704 including various components to provide logic and arithmetic functionality. In the example embodiment shown in FIG. 8, the logic block 704 includes a plurality of logic cells 800, which may be interconnected internally within logic block 704 and/or externally using the routing resources 780. For example, each logic cell 800 may include various components such as: a lookup table (LUT) 802, a mode logic circuit 804, a register 806 (e.g., a flip-flop or latch), and various programmable multiplexers (e.g., programmable multiplexers 812 and 814) for selecting desired signal paths for the logic cell 800 and/or between logic cells 800. In this example, the LUT 802 accepts four inputs 820A-820D, which makes it a four-input LUT (which may be abbreviated as "4-LUT" or "LUT4") that can be programmed by configuration data for the PLD 700 to implement any appropriate logic operation having four inputs or less. The mode logic 804 may include various logic elements and/or additional inputs, such as an input 820E, to support the functionality of various modes for the logic cell 800 (e.g., including various processing and/or functionality modes). The LUT 802 in other examples may be of any other suitable size having any other suitable number of inputs for a particular implementation of a PLD. In some embodiments, different size LUTs may be provided for different logic blocks 704 and/or different logic cells 800.

An output signal 822 from the LUT 802 and/or the mode logic 804 may in some embodiments be passed through the register 806 to provide an output signal 833 of the logic cell 800. In various embodiments, an output signal 823 from the LUT 802 and/or the mode logic 804 may be passed to the output 823 directly, as shown. Depending on the configuration of multiplexers 810-814 and/or the mode logic 804, the output signal 822 may be temporarily stored (e.g., latched) in the register 806 according to control signals 830. In some embodiments, configuration data for the PLD 700 may configure the output 823 and/or 833 of the logic cell 800 to be provided as one or more inputs of another logic cell 800 (e.g., in another logic block or the same logic block) in a staged or cascaded arrangement (e.g., comprising multiple levels) to configure logic and/or other operations that cannot be implemented in a single logic cell 800 (e.g., operations that have too many inputs to be implemented by a single LUT 802). Moreover, logic cells 800 may be implemented with multiple outputs and/or interconnections to facilitate selectable modes of operation.

The mode logic circuit 804 may be utilized for some configurations of the PLD 700 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation.

In this regard, the mode logic circuits 804, across multiple logic cells 802, may be chained together to pass carry-in signals 805 and carry-out signals 807, and/or other signals (e.g., output signals 822) between adjacent logic cells 802. In the example of FIG. 8, the carry-in signal 805 may be passed directly to the mode logic circuit 804, for example, or may be passed to the mode logic circuit 804 by configuring one or more programmable multiplexers. In some cases, the mode logic circuits 804 may be chained across multiple logic blocks 704.

The logic cell 800 illustrated in FIG. 8 is merely an example, and logic cells 800 according to different embodiments may include different combinations and arrangements of PLD components. Also, although FIG. 8 illustrates a logic block 704 having eight logic cells 800, a logic block 704 according to other embodiments may include fewer logic cells 800 or more logic cells 800. Each of the logic cells 800 of a logic block 704 may be used to implement a portion of a user design implemented by the PLD 700. In this regard, the PLD 700 may include many logic blocks 704, each of which may include logic cells 800 and/or other components which are used to collectively implement the user design.

Figure 9:
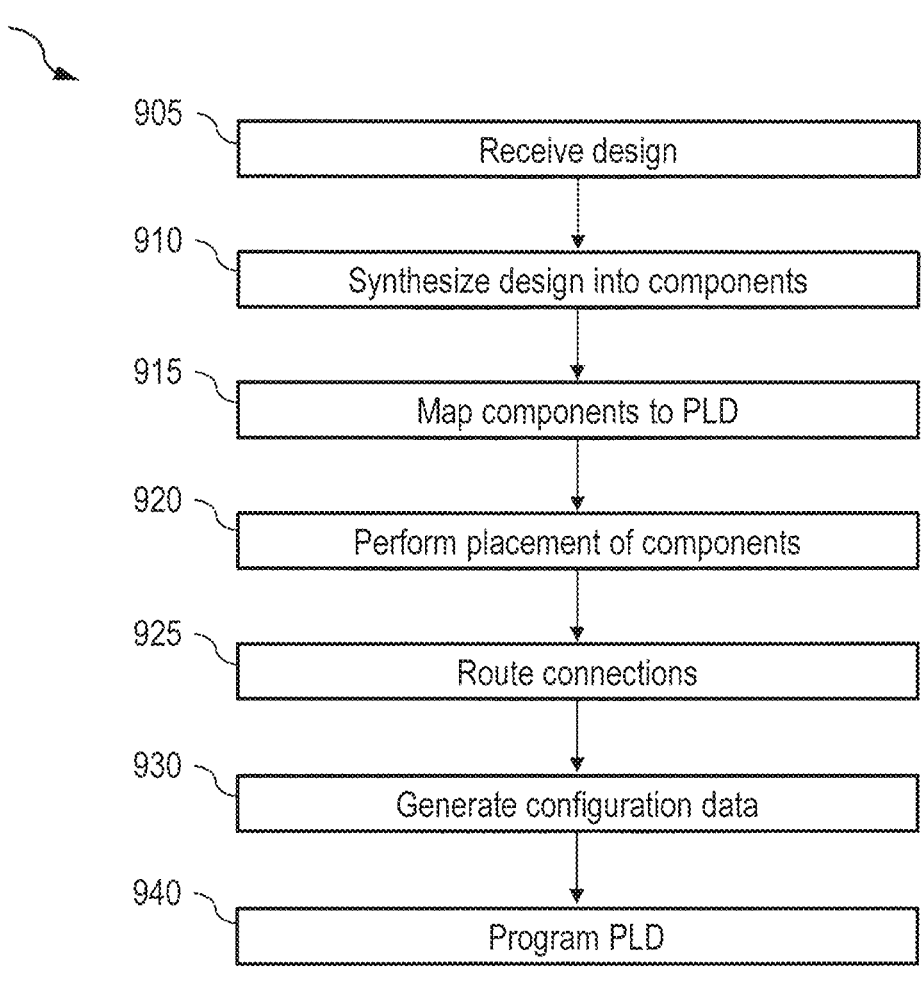
FIG. 9 illustrates a design process for a programmable logic device in accordance with one or more embodiments of the disclosure.

FIG. 9 illustrates a design process 900 for a PLD in accordance with one or more embodiments of the disclosure. For example, the process of FIG. 9 may be performed by system 730 running Lattice Diamond software to configure the PLD 700. In some embodiments, the various files and information referenced in FIG. 9 may be stored, for example, in one or more databases and/or other data structures in the memory 734, the machine readable medium 736, and/or other storage.

In operation 905, the system 730 receives a user design that specifies the desired functionality of the PLD 700. For example, the user may interact with the system 730 (e.g., through the user input device 737 and hardware description language (HDL) code representing the design) to identify various features of the user design (e.g., high level logic operations, hardware configurations, I/O and/or SERDES operations, and/or other features). In some embodiments, the user design may be provided in a RTL description (e.g., a gate level description). The system 730 may perform one or more rule checks to confirm that the user design describes a valid configuration of PLD 700. For example, the system 730 may reject invalid configurations and/or request the user to provide new design information as appropriate.

In operation 910, the system 730 synthesizes the design to create a netlist (e.g., a synthesized RTL description) identifying an abstract logic implementation of the user design as a plurality of logic components (e.g., also referred to as netlist components). In some embodiments, the netlist may be stored in Electronic Design Interchange Format (EDIF) in a Native Generic Database (NGD) file.

In some embodiments, synthesizing the design into a netlist in operation 910 may involve converting (e.g., translating) the high-level description of logic operations, hardware configurations, and/or other features in the user design into a set of PLD components (e.g., logic blocks 704, logic cells 800, and other components of the PLD 700 configured for logic, arithmetic, or other hardware functions to implement the user design) and their associated interconnections or signals. Depending on embodiments, the converted user design may be represented as a netlist.

In some embodiments, synthesizing the design into a netlist in operation 910 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections. In some cases, wiring distances may be determined based on timing.

In operation 915, the system 730 performs a mapping process that identifies components of the PLD 700 that may be used to implement the user design. In this regard, the system 730 may map the optimized netlist (e.g., stored in operation 910 as a result of the optimization process) to various types of components provided by the PLD 700 (e.g., logic blocks 704, logic cells 800, embedded hardware, and/or other portions of the PLD 700) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 910 to produce a netlist that is mapped to PLD components.

In operation 920, the system 730 performs a placement process to assign the mapped netlist components to particular physical components residing at specific physical locations of the PLD 700 (e.g., assigned to particular logic cells 800, logic blocks 704, clock-related circuitry 708, routing resources 780, and/or other physical components of PLD 700), and thus determine a layout for the PLD 700. In some embodiments, the placement may be performed in memory on data retrieved from one or more previously-stored NCD files, for example, and/or on one or more previously-stored NCD files, with the placement results stored (e.g., in the memory 734 and/or the machine readable medium 736) as another physical design file.

In operation 925, the system 730 performs a routing process to route connections (e.g., using the routing resources 780) among the components of the PLD 700 based on the placement layout determined in operation 920 to realize the physical interconnections among the placed components. In some embodiments, the routing may be performed in memory on data retrieved from one or more previously-stored NCD files, for example, and/or on one or more previously-stored NCD files, with the routing results stored (e.g., in the memory 734 and/or the machine readable medium 736) as another physical design file.

In various embodiments, routing the connections in operation 925 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

Changes in the routing may be propagated back to prior operations, such as synthesis, mapping, and/or placement, to further optimize various aspects of the user design.

Thus, following operation 925, one or more physical design files may be provided which specify the user design after it has been synthesized (e.g., converted and optimized), mapped, placed, and routed (e.g., further optimized) for the PLD 700 (e.g., by combining the results of the corresponding previous operations). In operation 930, the system 730 generates configuration data for the synthesized, mapped, placed, and routed user design. In operation 940, the system 730 configures/programs the PLD 700 with the configuration data by, for example, loading a configuration data bitstream into the PLD 700 over the connection 740.

Figure 10:
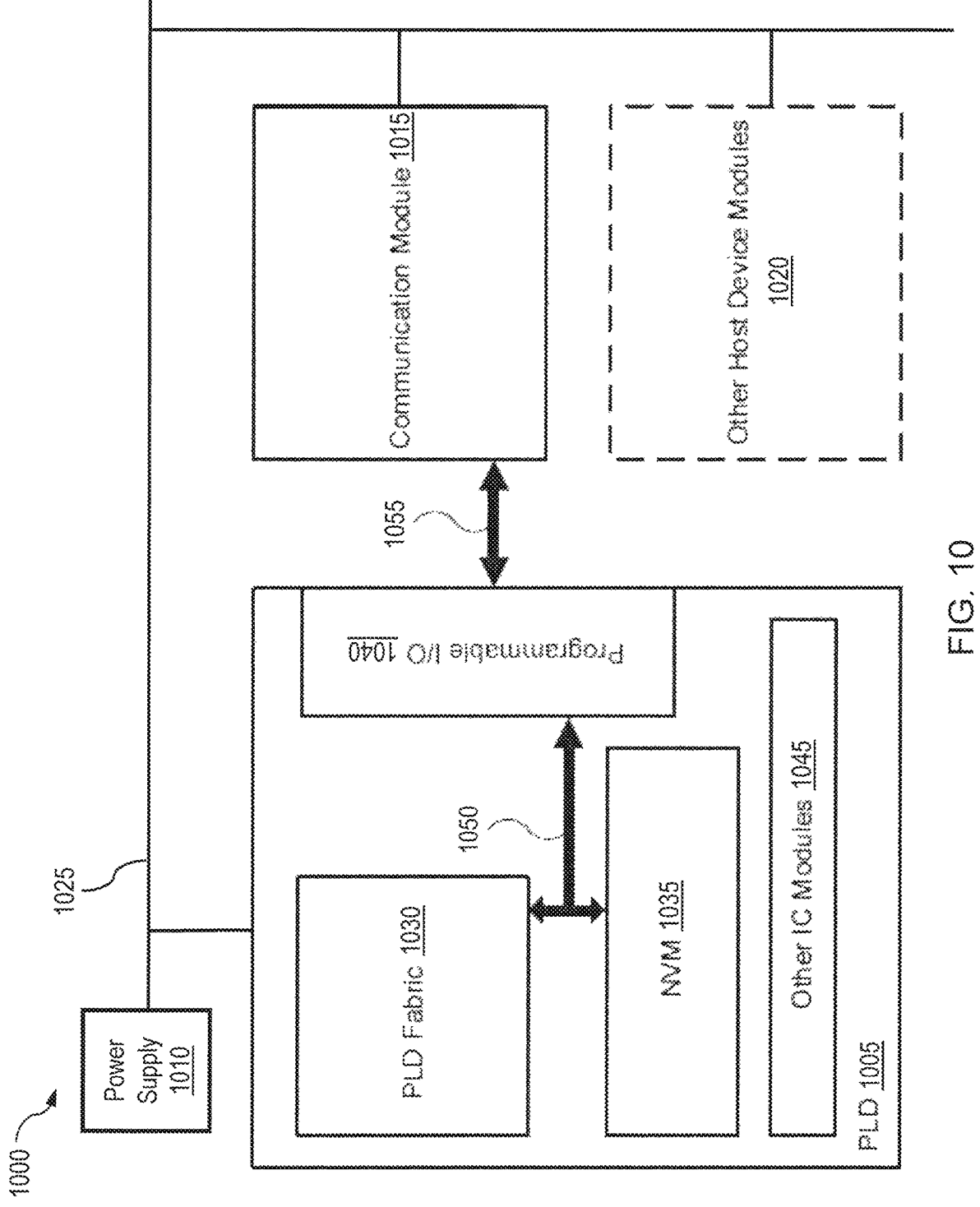
FIG. 10 illustrates a block diagram of a device including a programmable logic device in accordance with one or more embodiments of the disclosure.

FIG. 10 illustrates a block diagram of a device 1000 including a PLD 1005 in accordance with one or more embodiments of the disclosure. The device 1000 includes a power supply 1010 and one or more components facilitating operation of the device 1000, such as the PLD 1005, a communication module 1015, and other device modules 1020 to facilitate management of the PLD 1005, for example, or to facilitate device application. In various embodiments, the device 1000 may be implemented as a smart phone, a laptop computer, a tablet computer, a desktop computer, a smart environmental sensor, a home automation device (e.g., sensor and/or actuator), a network management device, a smart display or television, an automobile user interface, and/or other device. More generally, the device 1000 may be implemented as an embedded device or any other computing or electronic device integrable with the PLD 1005. In some embodiments, data provided between one or more of the components of the device 1000 via wires may utilize encoding schemes described herein, such as the encoding scheme shown in FIG. 2.

As shown in FIG. 10, the power supply 1010 may provide one or more supply voltages to various components of the device 1000 over power buses 1025. For example, the power supply 1010 may be implemented as a battery or battery bank, for example, with integrated charging and monitoring electronics. In other embodiments, the power supply 1010 may receive grid or other external power and include various power conditioning, regulating, and/or conversion components to provide the appropriate operating voltage for each component of the device 1000 using one or more of the power buses 1025. The power buses 1025 may include one or more conductive wires and/or traces to convey such supply voltages to the various components, as shown, and may in some embodiments include signaling traces to transmit and receive logic signals/data facilitating operation of the power supply 1010, the device 1000, and/or various components of the device 1000. In some embodiments, the power supply 1010 may be used to charge and discharge wires according to encoding schemes described herein, such as the encoding scheme shown in FIG. 2.

The PLD 1005 may be implemented by components similar to those described with respect to the PLD 700 of FIG. 7, but with additional configurable and/or hard IP elements configured to facilitate operation and/or communication with the PLD 1005 within a particular computing application and/or architecture. As shown in the embodiment illustrated in FIG. 10, the PLD 1005 may include a PLD fabric 1030 linked by various buses to a non-volatile memory (NVM) 1035, a programmable I/O 1040, and/or other IC modules 1045, which may all be implemented on a monolithic IC. In general, the PLD fabric 1030 may be implemented by any of the various components described with respect to the PLD 700 and may be configured using a design process similar to the design process 900 described in relation to FIG. 9 to generate and program the PLD fabric 1030 according to a desired configuration. In some cases, the PLD 1005 may be configured to use various hard IP elements identified in FIG. 10 to receive, decrypt, authenticate, and/or verify a received configuration prior to programming the PLD fabric 1030 according to the received configuration, for example, or to otherwise communicate with a management system for the PLD 1005.

The NVM 1035 may be implemented as a hard IP resource configured to provide securable non-volatile storage of data used to facilitate operation of the PLD 1005. The NVM 1035 may include multiple differentiated sectors, such as one or more configuration image sectors, a device key sector (e.g., an AES key sector and a separate public key/key pair sector), a UFM sector, and/or other defined storage sectors. Configuration image sectors may each store a configuration for the PLD fabric 1030, for example, so as to allow them to be selected (e.g., based on version or date) and used to program the PLD fabric 1030. A trim sector may be used to store manufacturer trim, device identifier, device category identifier, and/or other data specific to the PLD 1005, for example, such as a modifiable customer-specific ordering part number and/or a generated customer ID number. Device key sectors may be used to store encryption/decryption keys, public/private keys, and/or other security keys specific to the PLD 1005. UFM sectors may be used to store user data generally accessible by the PLD fabric 1030, such as configurations or application-specific security keys, certificates, and/or other secure(d) user data. Any one or more individual elements, portions, or sectors of the NVM 1035 may be implemented as configurable memory.

The programmable I/O 1040 may be implemented as at least partially configurable resources and/or hard IP resources configured to provide or support a communications link between the PLD fabric 1030 and an external controller, memory, and/or other device, such as the communication module 1015, for example, across a bus 1050 (e.g., an internal and/or integrated communications bus configured to link portions of the PLD fabric 1030 to the programmable I/O 1040, the NVM 1035, and/or other elements of the PLD 1005) and according to one or more external bus interfaces and/or protocols 1055. The programmable I/O 1040 may also be configured to support communications between the PLD fabric 1030 and/or the NVM 1035 across the bus 1050 and/or external bus interface/protocol 1055 with the communication module 1015 and/or other elements of the device 1000, for example, in addition or as an alternative to external system 730/machine readable medium 736, as described herein. In some embodiments, the bus 1050 and/or the programmable I/O 1040 may be integrated with the PLD fabric 1030. More generally, one or more components of the PLD 1005 shown as separate in FIG. 10 may be integrated with and/or within each other.

The other IC modules 1045 may be implemented as hard and/or configurable IP resources configured to facilitate operation of the PLD 1005. For example, the other IC modules 1045 may include a security engine implemented as a hard IP resource configured to provide various security functions for use by the PLD fabric 1030 and/or the device 1000. The other IC modules 1045 may also include a configuration engine implemented as a hard IP resource configured to manage the configurations of and/or communications amongst the various components of the PLD 1005, including to manage or control configurations of components of the PLD 1005, boot of the PLD fabric 1030, and flow control throughout the PLD 1005. In some embodiments, the other IC modules 1045 may include one or more communication modules (e.g., similar to the communication module 1015 of the device 1000) that are integrated with the PLD 1005 and that can perform various operations or subsets of operations to form and/or manage communications links over wired and/or wireless networks.

In further embodiments, the other IC modules 1045 may include one or more additional external access busses implemented according to one or more of a JTAG, 12C, SPI, and/or other external access bus or protocol, for example, configured to provide access to and/or from the communication module 1015 and/or other device modules 1020. For example, although shown in FIG. 10 as integrated as a hard IP resource within the PLD 1005, NVM 1035, or a similar additional hard IP resource may be integrated with the device 1000 (e.g., as other device modules 1020) and accessible (e.g., by the PLD fabric 1030 and/or other elements of the PLD 1005) over the internal bus 1050, external bus interface/protocol 1055, and/or any one or combination of such external access buses or protocols.

The communication module 1015 may be implemented as a network communications IC configured to form communications links to a remote external device (e.g., over one or more wired and/or wireless networks) used to manage operation of the PLD 1005. For example, in some embodiments, the communication module 1015 may be implemented as a wireless communication module configured to support a wireless communications link (e.g., formed according to WiFi, Bluetooth, Zigbee, Zwave, near-field communication (NFC), cellular, and/or other open and/or proprietary wireless communication protocols) to a communications network. In such embodiments, the communication module 1015 may be configured to manage various security features of such wireless communications link (e.g., establishing communications link credentials, employing communications link credentials to establish a wireless communications link, negotiating encryption keys for encrypted communications tunnels established over such wireless communications link, such as transport layer security (TLS)), for example, and/or may be configured to be controlled by the PLD 1005 and/or other device modules 1020 to manage such security features. The PLD 1005 may be configured to take control of operation of the communication module 1015, superseding control otherwise by the device 1000, over external bus interface/protocol 1055 and/or other external bus interface/protocol implemented by the PLD 1005 and/or the device 1000.

The other device modules 1020 may include various computing, sensor, and/or actuator elements configured to implement a device application, for example, such as a remote sensor application, a remote controller application, and/or a remote computing application. The other host modules 1020 may also include various other communication buses, power storage and delivery elements, user interfaces (e.g., buttons, keyboard, mouse, track pad, and/or displays/touch screen displays) to support such host device applications.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. An encoding method comprising:
receiving a bitstream comprising a plurality of bits; and
for each bit of the plurality of bits:
transitioning between two states of a plurality of states in response to the bit;
inverting a differential pair of data signals associated with the bit in response to the transitioning to obtain differentially transitioned data signals;
maintaining a third data signal associated with the bit in response to the transitioning; and
transmitting each data signal of the differentially transitioned data signals and the third data signal over a respective wire.

2. The encoding method of claim 1, wherein a transition between any two states of the plurality of states is associated with substantially the same power for the inverting.

3. The encoding method of claim 1, wherein:
each data signal of the differentially transitioned data signals and the third data signal is associated with a first logic level or a second logic level complementary to the first logic level; and
for a first bit of the bitstream:
the differentially transitioned data signals associated with the first bit comprise a first data signal associated with the first bit and a second data signal associated with the first bit;
the second data signal is complementary to the first data signal;
the differential pair of data signals associated with the first bit comprises a first data signal associated with a second bit and a second data signal associated with the second bit;
the inverting comprises:
inverting the first data signal associated with the second bit on a first wire to obtain the first data signal associated with the first bit on the first wire; and
inverting the second data signal associated with the second bit on a second wire to obtain the second data signal associated with the first bit on the second wire.

4. The encoding method of claim 3, wherein, for the first bit, the maintaining comprises maintaining the third data signal associated with the second bit on a third wire to provide the third data signal associated with the first bit on the third wire.

5. The encoding method of claim 3, wherein the first bit is associated with a first clock cycle, and wherein the second bit is associated with a second clock cycle temporally adjacent to and preceding the first clock cycle.

6. The encoding method of claim 3, wherein:
the first bit is associated with a first clock cycle;
a third bit of the bitstream is associated with a second clock cycle temporally adjacent and subsequent to the first clock cycle;
for the third bit:
in response to the transitioning, identifying the differential pair of data signals associated with the third bit from among the first data signal associated with the first bit, the second data signal associated with the first bit, and the third data signal associated with the first bit and identifying a remaining data signal among the first data signal associated with the first bit, the second data signal associated with the first bit, and the third data signal associated with the first bit;
the inverting comprises inverting the differential pair of data signals associated with the third bit; and
the maintaining comprises maintaining the remaining data signal.

7. The encoding method of claim 3, wherein for the first bit:
the transitioning comprises transitioning from a first state of the plurality of states to a second state of the plurality of states in response to the first bit;
the method further comprises determining, based on the second state, the first data signal associated with the first bit, the second data signal associated with the first bit, and the third data signal associated with the first bit;
the first state is associated with the first data signal associated with the second bit, the second data signal associated with the second bit, and the third data signal associated with the second bit; and the second state is associated with the first data signal associated with the first bit, the second data signal associated with the first bit, and the third data signal associated with the first bit.

8. The encoding method of claim 7, wherein, for a third bit of the bitstream:

the transitioning comprises transitioning from the second state to an other state of the plurality of states in response to the third bit;

based on the other state, identifying the differential pair of data signals associated with the third bit from among the first data signal associated with the first bit, the second data signal associated with the first bit, and the third data signal associated with the first bit and identifying a remaining data signal among the first data signal associated with the first bit, the second data signal associated with the first bit, and the third data signal associated with the first bit;

the inverting comprises inverting the differential pair of data signals associated with the third bit;

the maintaining comprises maintaining the remaining data signal; and the inverting associated with the third bit is associated with substantially the same power as the inverting associated with the first bit.

9. The encoding method of claim 3, wherein the first bit and the second bit are associated with the same logic level.

10. The encoding method of claim 1, wherein:

each of the plurality of states is associated with three data signals; and for each of the plurality of states, two of the three data signals are associated with a first logic level and a remaining data signal of the three data signals is associated with a second logic level complementary to the first logic level.

11. The encoding method of claim 10, wherein the first logic level is a 0 and the second logic level is a 1, or wherein the first logic level is a 1 and the second logic level is a 0.

12. An encoder configured to perform the method of claim 1.

13. A decoding method comprising:

receiving a plurality of sets of data signals;

for each set of data signals:

transitioning between two states of a plurality of states; and determining a bit in response to the transitioning, wherein:

a first set of data signals is associated with a first clock cycle;

a second set of data signals is associated with a second clock cycle temporally adjacent and subsequent to the first clock cycle;

for the first set of data signals, the transitioning comprises transitioning from a first state of the plurality of states to a second state of the plurality of states, wherein the bit associated with the first set is based on the first state and the second state; and for the second set of data signals, the transitioning comprises transitioning from the second state to an other state of the plurality of states, wherein the bit associated with the second set of data signals is based on the second state and the other state.

14. The decoding method of claim 13, wherein each transition between two states of the plurality of states is associated with a transition in signal levels from a set of the plurality of sets of data signals to an other set of the plurality of sets of data signals, and wherein a transition between any two states of the plurality of states is associated with substantially the same power for transitioning the signal levels.

15. The decoding method of claim 13, wherein:

each of the plurality of states is associated with a set of three data signals; and for each of the plurality of states, two of the three data signals are associated with a first logic level and a remaining data signal of the three data signals is associated with a second logic level complementary to the first logic level.

16. A system comprising:

a plurality of wires; and an encoding circuit configured to:

receive a bitstream comprising a plurality of bits;

for each bit of the plurality of bits:

transition between two states of a plurality of states in response to the bit;

invert a differential pair of data signals associated with the bit in response to transitioning to obtain differentially transitioned data signals;

maintain a third data signal associated with the bit in response to the transitioning; and transmit each data signal of the differentially transitioned data signals and the third data signal over a respective one of the plurality of wires.

17. The system of claim 16, further comprising a power supply configured to provide power over a power bus, wherein a transition between any two states of the plurality of states is associated with substantially the same power provided over the power bus to the encoding circuit for inverting the differential pair.

18. The system of claim 16, further comprising a decoding circuit configured to:

receive, over the plurality of wires, a plurality of sets of data signals; and for each set of data signals:

transition between two states of the plurality of states in response to the set of data signals; and determine a bit in response to transitioning between two states.

19. The system of claim 18, wherein each transition between two states of the plurality of states is associated with a transition in signal levels from a set of the plurality of sets of data signals to an other set of the plurality of sets of data signals, and wherein a transition between any two states of the plurality of states is associated with substantially the same power for transitioning the signal levels.

20. The system of claim 18, wherein:

each of the plurality of states is associated with a set of three data signals;

each of the three data signals is received over a respective wire of the plurality of wires; and for each of the plurality of states, two of the three data signals are associated with a first logic level and a remaining data signal of the three data signals is associated with a second logic level complementary to the first logic level.

\* \* \* \* \*